US012180777B2

(12) United States Patent
Bernhagen et al.

(10) Patent No.: US 12,180,777 B2
(45) Date of Patent: Dec. 31, 2024

(54) FENESTRATION UNIT INSTALLATION CLIPS AND ASSOCIATED METHODS

(71) Applicant: Pella Corporation, Pella, IA (US)

(72) Inventors: Todd A Bernhagen, Pella, IA (US); Jaime P. Ogbourne, Knoxville, IA (US)

(73) Assignee: Pella Corporation

( * ) Notice: Subject to any disclaimer, the term of this patent is extended or adjusted under 35 U.S.C. 154(b) by 0 days.

(21) Appl. No.: 18/646,289

(22) Filed: Apr. 25, 2024

(65) Prior Publication Data

US 2024/0368935 A1 Nov. 7, 2024

Related U.S. Application Data

(60) Provisional application No. 63/558,603, filed on Feb. 27, 2024, provisional application No. 63/581,834, filed on Sep. 11, 2023, provisional application No. 63/520,276, filed on Aug. 17, 2023, provisional application No. 63/463,103, filed on May 1, 2023.

(51) Int. Cl.
*E06B 1/60* (2006.01)

(52) U.S. Cl.
CPC .................................... *E06B 1/603* (2013.01)

(58) Field of Classification Search
CPC .......... E06B 1/60; E06B 1/6023; E06B 1/603; E06B 1/6038; E06B 1/6046; E06B 1/6061
See application file for complete search history.

(56) References Cited

U.S. PATENT DOCUMENTS 2,722,170 A 11/1955 Broberg
2,840,202 A 6/1958 Hehr
(Continued)

FOREIGN PATENT DOCUMENTS

DE 2019750 A1 11/1971
DE 2332086 A1 1/1975
(Continued)

OTHER PUBLICATIONS

SeVan Sales, Inc., "A revolutionary system designed specifically for high end windows and doors Easy Installation Guide" Shimex Shimming and Anchoring System, 2 pages.
(Continued)

*Primary Examiner* — Chi Q Nguyen
(74) *Attorney, Agent, or Firm* — FAEGRE DRINKER BIDDLE & REATH LLP

(57) ABSTRACT

Installation systems and methods for fenestration units configured to be set into a rough opening (RO) from interior side of a building structure or wall. The fenestration units may include a frame having a perimeter; and at least one anchoring clip including a first anchoring clip. The first anchoring clip may be coupled to the perimeter of the frame and transitionable between a stowed configuration and a deployed configuration. The first anchoring clip may include a coupling bracket having a first leg and a second leg and a carrier bracket configured to receive the first leg of the coupling bracket. In the stowed configuration, the second leg projects inwardly away from the perimeter toward the center of the frame, and in the deployed configuration, the second leg projects outwardly from perimeter and away from the center of the frame.

30 Claims, 14 Drawing Sheets

(56) References Cited

U.S. PATENT DOCUMENTS 2,840,203 A 6/1958 Hehr
2,863,180 A 12/1958 Birdwell et al.
2,902,727 A 9/1959 Samolis
3,238,679 A 3/1966 Capoccia
3,675,293 A 7/1972 Hajduk
4,014,146 A 3/1977 Dimascio et al.
4,028,849 A 6/1977 Anderson
4,473,981 A 10/1984 Simpson
4,488,391 A 12/1984 Pavnica
4,512,125 A 4/1985 Eriksson et al.
4,578,905 A 4/1986 Hout
4,660,325 A 4/1987 Bauer et al.
4,750,302 A 6/1988 Bechtold
4,821,472 A 4/1989 Tix
4,887,407 A * 12/1989 Nelson .................. E06B 1/6069
52/745.16
4,995,605 A 2/1991 Conville
5,119,609 A 6/1992 Tait et al.
5,572,840 A 11/1996 Fast et al.
5,590,496 A 1/1997 Martin et al.
5,619,828 A 4/1997 Ver Meer
5,655,342 A 8/1997 Guillemet et al.
5,655,343 A * 8/1997 Seals ..................... E06B 1/6069
52/745.15
5,692,350 A 12/1997 Murphy, Jr.
5,722,207 A 3/1998 Anderson et al.
5,927,039 A 7/1999 De Boer
5,934,019 A 8/1999 Rotharmel et al.
6,216,402 B1 4/2001 Van De Laar
6,282,852 B1 9/2001 Walcker
6,286,274 B1 9/2001 McKann et al.
6,293,061 B1 9/2001 Horak, Jr.
6,526,709 B1 3/2003 Jacobsen
6,560,934 B1 5/2003 Workman
6,688,056 B2 2/2004 Von et al.
6,895,718 B2 5/2005 Moffatt
7,162,841 B2 1/2007 Kownacki
7,331,145 B2 2/2008 Feucht et al.
7,490,441 B2 2/2009 Burton et al.
7,490,442 B1 2/2009 Jackson et al.
7,716,886 B2 5/2010 Gordon
7,814,716 B2 10/2010 Moffatt
7,882,662 B2 2/2011 Root et al.
8,006,445 B2 8/2011 Burton et al.
8,024,899 B2 9/2011 Prince et al.
8,109,052 B2 2/2012 Rosende et al.
8,261,498 B2 9/2012 Poirier
8,333,359 B2 12/2012 Gordon
8,528,280 B2 9/2013 Coil et al.
8,550,140 B2 10/2013 Kelley
8,813,437 B1 8/2014 Spofford
RE45,355 E 2/2015 Root et al.
8,979,047 B2 3/2015 Coyle
9,038,334 B2 5/2015 Bren
9,038,698 B2 5/2015 Gibbs et al.
9,340,973 B2 5/2016 Carbary et al.
9,593,524 B2 * 3/2017 Rasmussen ........... E06B 1/6015
9,790,731 B1 10/2017 Bishman et al.
10,246,886 B2 4/2019 Mitchell
10,309,146 B1 6/2019 Rosende
10,400,501 B1 9/2019 Tatley et al.
10,550,586 B2 2/2020 Jeffries
10,662,698 B1 5/2020 Roegge
10,794,069 B2 10/2020 Gill et al.
10,844,617 B1 11/2020 Ahmad et al.
10,895,099 B2 1/2021 Vos
11,332,946 B2 5/2022 Hakeman et al.
11,391,083 B1 7/2022 Shattuck
11,643,864 B2 * 5/2023 Hoogland ............... E06B 9/581
160/100
11,643,866 B1 5/2023 Roberts et al.
11,732,524 B2 8/2023 Gordon
11,933,098 B1 3/2024 Bernhagen et al.
2001/0035268 A1 11/2001 Desrochers
2002/0095884 A1 7/2002 Lindgren et al.
2003/0145531 A1 8/2003 Holder
2004/0139669 A1 7/2004 Feucht et al.
2004/0154244 A1 * 8/2004 Moffatt ................. E06B 1/6015
52/204.55
2005/0066598 A1 3/2005 Williams
2005/0086878 A1 4/2005 Feucht et al.
2005/0262771 A1 12/2005 Gorman
2005/0262782 A1 12/2005 Harrison et al.
2006/0010822 A1 1/2006 Moffatt
2006/0236618 A1 10/2006 Williams
2006/0272274 A1 12/2006 Burton et al.
2007/0056230 A1 3/2007 Bren
2007/0144106 A1 6/2007 Kirk et al.
2008/0066400 A1 3/2008 Heppner
2008/0110110 A1 5/2008 Burton et al.
2008/0115430 A1 * 5/2008 Feucht .................... E04D 13/02
52/200
2008/0222979 A1 9/2008 Rissmiller
2009/0044463 A1 2/2009 Moscone et al.
2009/0077910 A1 3/2009 Gordon
2009/0173019 A1 7/2009 Pryor et al.
2009/0246440 A1 10/2009 Eagle
2009/0266014 A1 10/2009 Green
2010/0058678 A1 3/2010 Lutz et al.
2010/0083598 A1 4/2010 Smith
2011/0024591 A1 * 2/2011 Gordon ................. E06B 1/6015
29/428
2011/0056054 A1 3/2011 Moffatt
2011/0258947 A1 10/2011 Peterson
2012/0049022 A1 3/2012 Coyle
2013/0008106 A1 1/2013 Michaud
2014/0260008 A1 9/2014 Eis et al.
2014/0331575 A1 11/2014 Vos et al.
2015/0233169 A1 8/2015 Saunders et al.
2016/0115726 A1 4/2016 Hodgson et al.
2016/0123053 A1 * 5/2016 Martin ................... B60J 5/0491
49/504
2016/0319557 A1 * 11/2016 Gordon ............... E04F 21/0015
2017/0051552 A1 2/2017 Rosende et al.
2018/0058135 A1 3/2018 Vos
2018/0187475 A1 7/2018 Mitchell
2020/0032527 A1 1/2020 Hakeman et al.
2020/0208463 A1 7/2020 Mascarenhas et al.
2020/0318418 A1 10/2020 Burger et al.
2021/0123290 A1 4/2021 Jantzi
2022/0259915 A1 8/2022 Lipsky
2022/0349190 A1 11/2022 Hakeman et al.
2023/0160202 A1 9/2023 Friezner et al.
2024/0318494 A1 9/2024 Bernhagen et al.

FOREIGN PATENT DOCUMENTS

DE 202016101375 U1 3/2016
EP 0137812 B1 4/1985
EP 0356430 B1 6/1994
EP 2378043 A2 10/2011
EP 2948609 B1 5/2018
GB 2218448 A 11/1989
WO 84/03120 A1 8/1984
WO 88/07121 A1 9/1988
WO 2004/070153 A1 8/2004
WO 2007/059159 A2 5/2007
WO 2014/116102 A1 7/2014
WO 2015/142201 A2 9/2015
WO 2020/060581 A1 3/2020
WO 2020/071932 A1 4/2020
WO 2022/042939 A1 3/2022
WO 2022/235171 A1 11/2022
WO 2023091037 A1 5/2023
WO 2023186243 A1 10/2023
WO 2023186900 A1 10/2023

OTHER PUBLICATIONS

"In Depth: Benefits of Anchoring Method Window Installation", dated Feb. 6, 2020, available at https://www.innotech-windows.com/blog/in-depth-benefits-of-anchoring-method-window-installation.

(56) References Cited

OTHER PUBLICATIONS

"Tru-Loc(Trademark) Window & Door Installation Anchor", available at https://frontlinebldg.com/all-products/accessories/tru-loc-window-door-installation-anchor/.
"Nailing Fin: Hinged PP1219", available at https://www.amesburytruth.com/products/extrusions/nailing-fin/hinged/hinged-pp1219.
Pella Corporation, "Pella Installation Instructions—Advanced Performance Nail Fin, Nail Fin With J-Channel and Enduraclad Exterior Trim With Nail Fin Windows", 18 pages.
International Search Report from EPO dated Jan. 15, 2024—PCT/US2023/075692.
International Search Report from EPO dated Sep. 10, 2024—PCT/US2024/026415.
Screen captures from YouTube video clip entitled "A new Door Install Tool that is Awesome!"; 7 pages, posted on Jul. 20, 2021 by Matt Risinger. Visited on Feb. 14, 2024. https://www.youtube.com/watch?v=Q3VEjTszBjQ.
International Search Report from EPO dated Oct. 30, 2024—PCT/US2024/026415.

* cited by examiner

FENESTRATION UNIT INSTALLATION CLIPS AND ASSOCIATED METHODS

CROSS REFERENCE TO RELATED APPLICATIONS

This application claims priority to the following: U.S. Provisional Patent Application No. 63/558,603, entitled "Fenestration Unit Installation Clips and Associated Methods", filed Feb. 27, 2024; U.S. Provisional Patent Application No. 63/581,834, entitled "Fenestration Unit with Interior Installation Features and Associated Systems and Methods", filed Sep. 11, 2023; U.S. Provisional Patent Application No. 63/520,276, entitled "Fenestration Unit with Interior Installation Features and Associated Systems and Methods", filed Aug. 17, 2023; U.S. Provisional Patent Application No., 63/463,103 entitled "Fenestration Unit with Interior Installation Features and Associated Systems and Methods", filed May 1, 2023. The contents of each application are hereby incorporated by reference in their entirety.

BACKGROUND

Window designs typically have an exterior nailing flange and are installed from the exterior side of the building envelope. Two installers work together, one on the interior and the other on the exterior. Some installation crews have determined it is easier to unpackage the window inside the building where it is relatively clean and flat. Then they pass the window through the rough opening (RO) to a person on the exterior side. In some instances, the person on the exterior side is on a ladder, which can substantially complicate installation. The person on the ladder may need to support at least part of the window's weight during installation steps.

Background Patents

| Patent Number | Title | Filing Date |
|---|---|---|
| U.S. Pat. No. 8,621,795 | Fenestration frame with bonded support brackets . . . | 2011 Apr. 20 |
| U.S. Pat. No. 7,162,841 | Spring clip and method of window installation | 2004 Feb. 13 |
| DE 2020 16101375 | Supporting and fastening window . . . to . . . wall opening | 2016 Mar. 11 |
| WO 2015/142201 | Mounting, sealing and thermal insulation of windows . . . | 2014 Sep. 05 |
| U.S. Pat. No. 6,293,061 | System and method for installing a jamb | 1999 Sep. 30 |
| U.S. Pat. No. 11,332,946 | Installation features for fenestration units . . . | 2019 Jul. 25 |
| U.S. Pat. No. 8,006,445 | Self-sealing window installation and method | 2008 Jan. 15 |
| U.S. 2008/0127564 | Pre-hung door assembly and method of installation | 2008 Jan. 18 |
| U.S. Pat. No. 10,895,099 | Support bracket for window installation . . . | 2016 Aug. 23 |
| U.S. Pat. No. 10,794,069 | Door Hanger Bracket | 2018 Sep. 21 |

Background Products

Innotech Windows & Doors, Strap Anchors
https://www.innotech-windows.com/blog/in-depth-benefits-of-anchoring-method-window-installation FrontLine Tru-Loc™ Brackets
https://frontlinebldg.com/all-products/accessories/tru-loc-window-door-installation-anchor/

Amesbury Hinged Fin
https://www.amesburytruth.com/products/extrusions/nailing-fin/hinged/hinged-pp1219

EZ-Hang™ Brackets
https://ezhangdoor.com/

SUMMARY

Various advantages may be achieved according to the example systems and methods described herein. The various examples may be one or more of: more efficient (e.g., cycle time reduced by 50% or more); easier to learn; easier to remember; easier to train; may be less physically demanding (e.g., window is not set from the exterior side which could be on uneven ground or require a ladder); window is unable to fall out toward exterior during installation; can be installed by a single person from the interior of the building structure; interior and exterior installation tasks do not need to be done simultaneously; improved fenestration install quality and fenestration performance following installation; delivers an installation method that is unique to the industry and offers many benefits for the installer; faster cycle times; improved performance (water and air infiltration); adapts to wall depth variation; simplifies casing installation for finish carpenters; separates interior and exterior work so they can be done "independently".

The fenestration unit includes an anchoring clip system that may be used to hold and stabilize the fenestration unit within a rough opening framing during installation of the fenestration unit. In some embodiments, the anchoring clip system may be adjustable to accommodate a variety of wall construction depths (e.g., accommodating drywall, foam insulation, sheeting, and/or jamb extensions). The anchoring clip system may provide a means to accurately gauge against the rough opening framing during installation of the fenestration unit.

According to one embodiment ("Embodiment 1"), a fenestration unit has an interior side and an exterior side that is configured for installation in an opening in a structure defined by a rough opening framing. The fenestration unit comprises a frame having a perimeter and defining a center and at least one anchoring clip including a first anchoring clip, the first anchoring clip coupled to the perimeter of the frame and transitionable between a stowed configuration and an installation configuration. The first anchoring clip includes a coupling bracket having a first leg and a second leg and a carrier bracket configured to receive a portion of the first leg. In the stowed configuration, the second leg projects inwardly away from the perimeter toward the center of the frame. In the installation configuration, the second leg projects outwardly from perimeter and away from the center of the frame.

According to another embodiment ("Embodiment 2"), further to Embodiment 1, the first leg and the second leg extend orthogonal to one another.

According to another embodiment ("Embodiment 3"), further to Embodiment 1, the second leg includes at least one aperture configured to receive a fastener for securing the second leg to the rough opening framing when the first anchoring clip is in the installation configuration.

According to another embodiment ("Embodiment 4"), further to Embodiment 1, the coupling bracket includes at least one detent defined along a length of the first leg and the carrier bracket includes at least one catch configured to engage with the at least one detent when the anchoring clip is in the installation configuration.

According to another embodiment ("Embodiment 5"), further to Embodiment 4, the at least one detent is positioned at a pre-selected length along the first leg corresponding to a wall depth of the rough opening framing.

According to another embodiment ("Embodiment 6"), further to Embodiment 5, the wall depth is one of a 2×4 wall depth, a 2×6 wall depth, or a 2×8 wall depth.

According to another embodiment ("Embodiment 7"), further to Embodiment 4, the at least one detent includes a plurality of detents positioned at ⅛-inch increments or less along a portion of the length of the first leg.

According to another embodiment ("Embodiment 8"), further to Embodiment 4, the at least one detent includes a plurality of detents positioned at ⅛-inch increments or greater along a portion of the length of the first leg.

According to another embodiment ("Embodiment 9"), further to Embodiment 1, the first anchoring clip is configured to provide an audible cue when the coupling bracket is received by the carrier bracket and positioned in the installation configuration.

According to another embodiment ("Embodiment 10"), further to Embodiment 1, the carrier bracket includes at least one catch defining a ramp edge and the coupling bracket includes an insert guide defined along a leading edge of the coupling bracket, wherein the ramp edge is configured to contact the insert guide upon insertion of the coupling bracket within the carrier bracket in the installation configuration.

According to another embodiment ("Embodiment 11"), further to Embodiment 10, a portion of the carrier bracket is lifted away from the frame when the coupling bracket is received by the carrier bracket in the installation configuration.

According to another embodiment ("Embodiment 12"), further to Embodiment 1, the first anchoring clip is configured to require 8 lbs of force or less to receive the coupling bracket with the carrier bracket in the installation configuration.

According to another embodiment ("Embodiment 13"), further to Embodiment 1, the first anchoring clip has a first orientation feature defined by the coupling bracket and a second orientation feature defined by the carrier bracket, wherein the first orientation feature and the second orientation feature align with one another when the first anchoring clip is in the installation configuration. Optionally, the first orientation feature and the second orientation feature align when the first anchoring clip is gauged to a standard wall depth of the rough opening framing.

According to another embodiment ("Embodiment 14"), further to Embodiment 1, further including at least one gusset positioned at an intersection of the first leg and the second leg, wherein the gusset creates a gap between the coupling bracket and the perimeter of the frame when the first anchoring clip is in the stowed configuration.

According to another embodiment ("Embodiment 15"), further to Embodiment 14, the gussets are configured to create a marking on the perimeter of the frame when the first anchoring clip is in the installation configuration.

According to one embodiment ("Embodiment 16") a method of installing a fenestration unit having an interior side and an exterior side within a rough opening of a structure defined by rough opening framing comprises transitioning an anchoring system from a first, stowed configuration to a second, installation configuration, the anchoring system including a plurality of anchoring clips coupled to a perimeter of the fenestration unit, the plurality of anchoring clips including a first anchoring clip, wherein the anchoring system gauges the fenestration unit to an interior side of the rough opening framing, placing the fenestration unit within the rough opening framing from an interior side of the rough opening framing, and securing the anchoring system to the rough opening framing using one or more fasteners.

According to another embodiment ("Embodiment 17"), further to Embodiment 16, the first anchoring clip includes a coupling bracket and a carrier bracket configured to receive a portion of the coupling bracket. Transitioning an anchoring system from a first, stowed configuration to a second, installation configuration further includes removing the coupling bracket from the carrier bracket, rotating the coupling bracket, and re-inserting the coupling bracket into the carrier bracket.

According to another embodiment ("Embodiment 18"), further to Embodiment 17, the coupling bracket includes a first leg and a second leg angularly offset from the first leg. The method further includes removing the first leg from the carrier bracket, rotating the coupling bracket 180 degrees, and re-inserting the first leg into the carrier bracket.

According to another embodiment ("Embodiment 19"), further to Embodiment 17, the coupling bracket includes a first leg and a second leg angularly offset from the first leg. The method including removing the second leg from the carrier bracket, rotating the coupling bracket end-to-end, and inserting the first leg into the carrier bracket.

According to another embodiment ("Embodiment 20"), further to Embodiment 17, the method further includes determining the coupling bracket is seated within the carrier bracket through at least one of an audible cue and a visible cue.

According to another embodiment ("Embodiment 21"), further to Embodiment 16, the first anchoring clip includes a coupling bracket and a carrier bracket configured to receive a portion of the coupling bracket. The method further including gauging a wall depth of the rough opening framing to determine a wall depth and adjusting an insertion depth of the coupling bracket within the carrier bracket based on the wall depth.

According to another embodiment ("Embodiment 22"), further to Embodiment 21, the coupling bracket includes a second orientation feature (e.g., a through hole) defined along a length of the coupling bracket and the carrier bracket includes a first orientation feature (e.g., a notch), the method further including determining the insertion depth by aligning the first orientation feature and the second orientation feature.

According to another embodiment ("Embodiment 23"), further to Embodiment 22, the first anchoring clip includes a coupling bracket defining a plurality of detents along a length of the coupling bracket and the carrier bracket includes one or more catches configured to engage the detents. The method further including receiving the coupling bracket with the carrier bracket such that the at least one catch engages at least one of the detents at a desired position selected based upon the wall depth of the rough opening framing.

According to one embodiment ("Embodiment 24"), an anchoring clip comprises a coupling bracket having a first leg and a second leg, the first leg defining a length, at least one detent is defined along a portion of the length, and a leading end defined at one end of the length, the leading end having an insert guide; and a carrier bracket having a receiving pocket configured to receive a portion of the first leg, the carrier bracket including at least one catch configured to be received within the at one detent to releasably lock the first leg within the receiving pocket of the carrier bracket.

According to another embodiment ("Embodiment 25"), further to Embodiment 24, the at least one catch defines a ramp edge, and wherein, upon insertion of the first leg within the carrier bracket, the insert guide contacts the ramp edges and lifts a portion of the carrier bracket to facilitate receiving the coupling bracket with the carrier bracket.

According to another embodiment ("Embodiment 26"), further to Embodiment 24, the first leg is configured to be received within a generally central position of the receiving pocket, and wherein the at least one catch is configured to direct the insert guide to the generally central position of the receiving pocket.

According to another embodiment ("Embodiment 27"), further to Embodiment 24, the carrier bracket includes a backing plate and a receiver, and the receiving pocket is defined between the backing plate and the receiver.

According to another embodiment ("Embodiment 28"), further to Embodiment 24, the anchoring clip is configured to provide audible cue when the coupling bracket is received at a pre-selected depth within the carrier bracket.

According to another embodiment ("Embodiment 29"), further to Embodiment 24, the coupling bracket defines a first orientation feature, and the carrier bracket defines a second orientation feature. The first orientation feature and the second orientation feature are aligned with one another when the coupling bracket is received within the carrier bracket.

According to another embodiment ("Embodiment 30"), further to Embodiment 29, the anchoring clip is configured to be gauged to a wall depth defined by a rough opening framing. The pre-selected depth optionally corresponds to the wall depth.

The foregoing embodiments and additional embodiments described herein should not be read to limit or otherwise narrow the scope of any of the inventive concepts otherwise provided by the instant disclosure. While multiple examples are disclosed, still other embodiments will become apparent to those skilled in the art from this specification and its drawings, which show and describe various illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description, serve to explain the principles of the disclosure.

DETAILED DESCRIPTION

Definitions and Terminology

Figure 3:
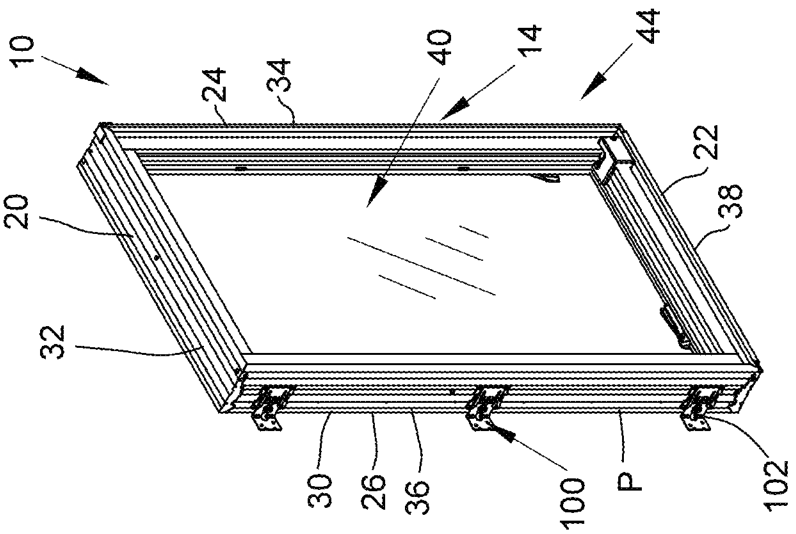
FIG. 3 is a top-oriented, perspective view of a fenestration unit from an exterior side showing the anchoring system in the second, installation configuration, according to some embodiments.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement may deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale and may be exaggerated to illustrate various aspects of the present disclosure, and in that regard, the drawing figures should not be construed as limiting.

Description of Various Embodiments

Various concepts of this patent specification address installation systems and methods for fenestration units, such as windows and doors. Some features of such systems and methods include one or more of the following: the fenestration unit configured to be set into a rough opening (RO) from the interior side of a building structure or wall defined by a rough opening framing; gauging to the interior face of rough opening framing for more accurate finishing (e.g., drywall and/or trim) offsets; the fenestration unit having attached pre-applied (e.g., factory-applied) anchoring clips configured for interior unit installation; and the fenestration unit being configured to be installed by a single person/installer.

In various examples, the fenestration units (e.g., fenestration unit 10) include features that promote installation of the fenestration unit from an interior side of a rough opening (RO) using a methodology that can be readily achieved by a single installer. In particular, a fenestration unit according to various examples includes an engagement system coupled to the frame, the engagement system configured to positively engage the interior face of the rough opening framing upon insertion of the fenestration unit in the rough opening (RO) from the interior side of the rough opening (RO). In this manner, a single individual may insert a fenestration unit into the rough opening (RO) on the interior side thereof and secure the fenestration unit to the interior side of the rough opening framing without needing a second person to hold the fenestration unit against the rough opening framing from an exterior side thereof. The engagement system, also referred to herein as an anchoring clip system, may hold and stabilize the fenestration unit within a framing of the rough opening (RO) such that shims are not required to hold the fenestration unit in place.

In various embodiments, the fenestration unit is anchored to and stabilized against an interior side of the rough opening framing via the anchoring clip system. Anchoring to the exterior side of the rough opening framing is not required, and in some examples, is not possible. In some examples, the exterior side of the rough opening framing includes insulation (e.g., a foam board), which is relatively soft, and does not provide a solid surface to anchor against, or to drive fasteners therethrough. By providing the anchoring clip system that interfaces with the interior side of the framing, challenges due to insulation may be lessened.

Figure 2:
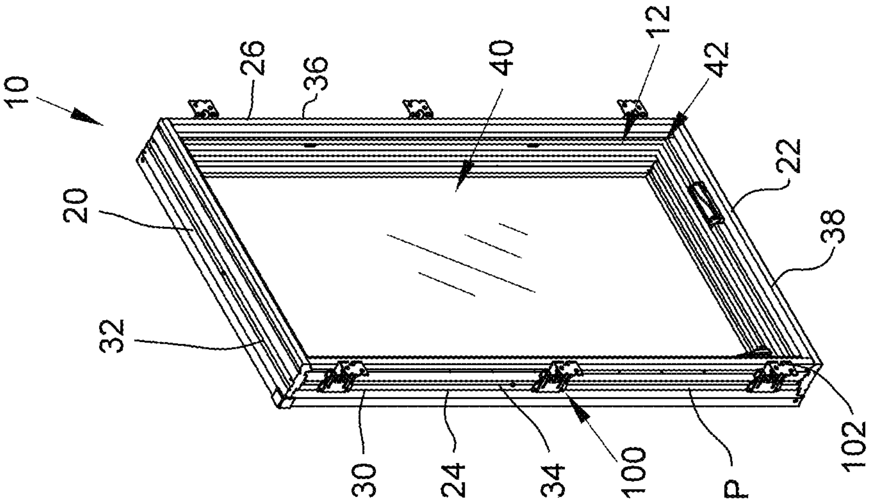
FIG. 2 is a top-oriented, perspective view of a fenestration unit from the interior side showing the anchoring system in a second, installation configuration, according to some embodiments.
Figure 1:
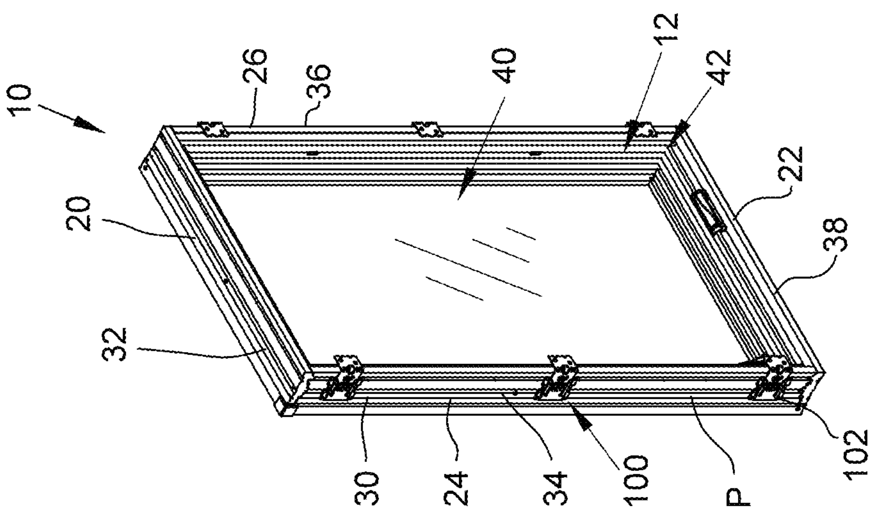
FIG. 1 is a top-oriented, perspective view of a fenestration unit from an interior side showing an anchoring system in a first, stowed configuration, according to some embodiments.

FIGS. 1 to 3 show a fenestration unit 10, according to some embodiments. FIGS. 1 and 2 are top-oriented perspective views from an interior side 12 of the fenestration unit 10. FIG. 3 is a top-oriented perspective view from an exterior side 14 of the fenestration unit 10. FIG. 1 illustrates the fenestration unit 10 in an initial, stowed or pre-installation configuration (e.g., as initially received by an installer). FIGS. 2 to 3 illustrate the fenestration unit 10 in a final, installed configuration. As referenced above, the term "fenestration unit" as used herein is to be read broadly to cover windows, doors, and the like.

As shown in FIG. 1, the fenestration unit 10 has a top 20, a bottom 22, a first side 24, and a second side 26. The fenestration unit 10 includes a frame 30 including a head 32, a first jamb 34, a second jamb 36, and a sill 38. The fenestration unit 10 also includes a panel unit or glazing unit 40 supported by the frame 30. The glazing unit 40 may be any of a variety of configurations, but in some embodiments is an insulated glass (IG) unit. As shown, the fenestration unit 10 is configured as a casement window, but any of a variety of configurations (fixed, single hung, double hung, awning or other) are also contemplated.

As shown, the frame 30 may be a wood frame (e.g., aluminum clad wood) design. However, vinyl, fiberglass, or other materials may be implemented for the frame 30. The frame 30 also includes an outer perimeter P and has a front face 42, or interior face 42 (FIG. 1), as well as a back face 44, or exterior face 44 (FIG. 3).

As shown in FIGS. 1 to 3, the fenestration unit 10 includes an anchoring clip system 100, also described as an engagement system. The anchoring clip system 100 includes a plurality of anchoring clips 102 secured to the outer perimeter P of the frame 30. In particular, the anchoring clips 102 are coupled to the first jamb 34 and the second jamb 36 (e.g., three to each). As shown, the anchoring clip system 100 includes six (6) anchoring clips 102, although greater (e.g., 6, 8, 10, 12, etc.) or fewer (e.g., 4 or 2) anchoring clips 102 are contemplated. Generally, embodiments will include at least four (4) anchoring clips 102, two upper anchoring clips 102 toward the head 32 and two lower anchoring clips 102 toward the sill 38. As the dimensions of the fenestration unit 10 increase, more anchoring clips 102 may be warranted to help ensure proper anchoring of the fenestration unit 10, where that functionality is described in greater detail below.

In use, each of the anchoring clips 102 can be set at an intended depth, or gauged, for installation (e.g., to accommodate jamb extensions and/or drywall returns which are not shown). The anchoring clips 102 can help gauge the fenestration unit 10 from an interior face of the rough opening (RO). This gauging capability helps ensure a proper offset for drywall thickness or other wall features and may help eliminate or reduce such problems as jamb extensions of the fenestration unit 10 being "proud" or "recessed" from an interior face of the finished wall surface (e.g., inner drywall face). The resulting installation using the anchoring clips 102 may help ensure flush jamb extensions relative to the interior face of the wall (e.g., inner drywall face) which makes the installation of trim (e.g., casing) of the fenestration unit 10 much more efficient for subsequent detailing steps (e.g., finish carpenters). The anchoring clips 102 may be coupled to the frame 30 either forward of the jamb extensions (e.g., in a more exterior direction, situated on the frame base) or may be coupled to the jamb extensions themselves.

In some implementations, the anchoring clips 102 are initially provided to an installer (e.g., shipped or delivered to the installer) attached to the fenestration unit 10 in a stowed configuration, for example as shown in FIG. 1. The installer (not shown) removes, flips, or rotates a portion of the anchoring clips 102 around, and reinserts a portion of the anchoring clips 102 to a desired overall depth by pushing to engage a retention feature (e.g., slot) of the anchoring clips 102. In various examples, the portion of the anchoring clips 102 may be both removed by the installer and reinserted without the use of tools. As referenced above, a typical, or average sized fenestration unit 10 will have four (4) to six (6) anchoring clips 102, although fewer or greater anchoring clips 102 are contemplated. As part of the installation process, an installer (not shown) will flip (rotate axially) the anchoring clips 102 around from the position shown in FIG. 1 (first, stowed configuration) to that shown in FIGS. 2 to 3 (second, installation configuration) as part of installation prep work. In some designs, the anchoring clips 102 may be adjustable for different installation depths (e.g., to accommodate ½-inch, ⅝-inch, or other thicknesses of interior drywall or other building materials). In other embodiments, the different installation depths may be substantially flush against the rough opening framing.

Anchoring clips 102 may also have different adjustment settings or features on different portions of the anchoring clips 102 such that the anchoring clips 102 may be flipped to accommodate different (e.g., greater) adjustability. For example, one portion (e.g., one leg) of the anchoring clip 102 may have a first set of adjustment features (e.g., to accommodate ½-inch or ⅝-inch interior drywall thickness offsets) and another portion (e.g., another leg) of the anchoring clip 102 may have a second set of adjustment features (e.g., multiple slots for ⅛-inch or 1/16-inch incremental adjustments over a desired distance).

With the foregoing in mind, as shown in FIGS. 1 to 3, the anchoring clips 102 may each be substantially similar to one another and may be described cumulatively in association with a first anchoring clip of the anchoring clips 102, example designs of which are subsequently described.

Figure 5:
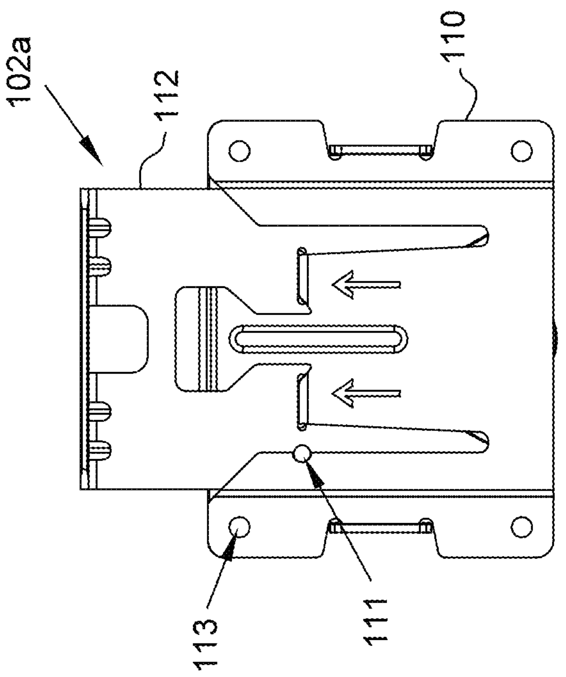
FIG. 5 is a top view of the first anchoring clip of FIG. 4, according to some embodiments.
Figure 6:
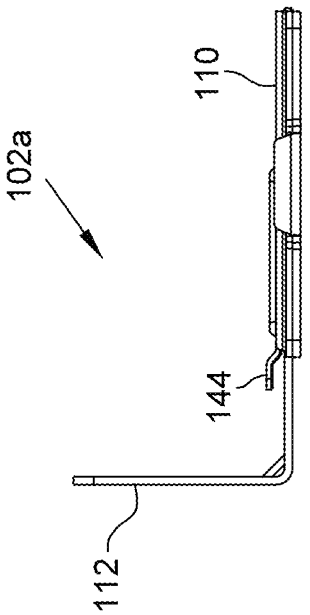
FIG. 6 is a side view of the first anchoring clip of FIG. 4, according to some embodiments.
Figure 4:
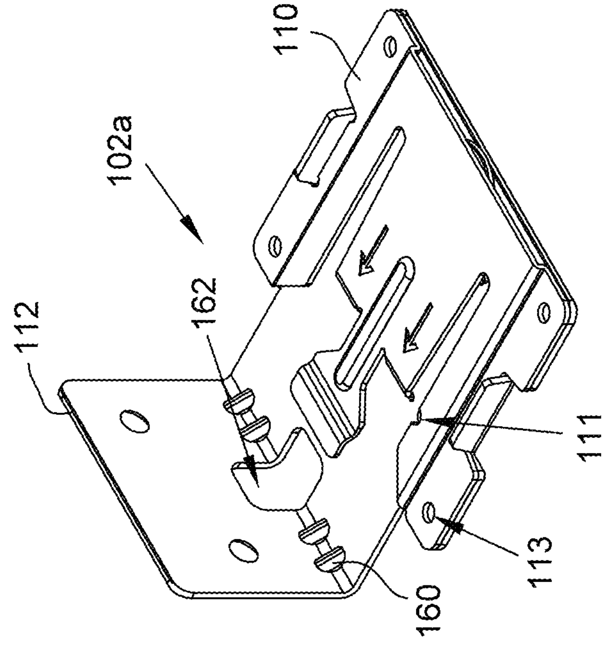
FIG. 4 is a top-oriented perspective view of a first anchoring clip of the anchoring system of FIG. 2, according to some embodiments.

FIGS. 4 to 6 show of a first anchoring clip 102*a* of the anchoring clips 102, according to some embodiments. FIG. 4 shows a top-oriented perspective view of the first anchoring clip 102*a*, FIG. 5 shows a top view of the first anchoring clip 102*a*, and FIG. 6 shows a side-view of the first anchoring clip 102*a*.

As shown, the first anchoring clip 102*a* includes a carrier bracket 110 configured to be coupled to the perimeter P (FIG. 1) of the frame 30 and a coupling bracket 112. In some embodiments, the carrier bracket 110 may be coupled to the frame 30 via adhesion to the frame 30. In other embodiments, the carrier bracket 110 may couple to the frame 30 via the fasteners and the carrier bracket 110 may include one or more fastener apertures 113, to receive the fasteners. However, other attachment methods are contemplated, including adhesives, heat bonding, integral formation, or other methods. The first anchoring clip 102*a* is optionally made from stamped sheet metal (e.g., galvanized steel) or other appropriate material/manufacturing method. Although the carrier bracket 110 is shown as a separate component from the frame 30 (e.g., pre-attached at the factory or other location remote from the installation site), the carrier bracket 110 or features thereof may be integrally formed (e.g., molded, machined, routed, etc.) into the frame 30 as part of a manufacturing process, for example.

The coupling bracket 112 is securable to the carrier bracket 110 such that the coupling bracket 112 can be transitioned between a first stowed configuration (FIG. 1) and a second installation configuration (FIGS. 2 to 3). As further described, to transition between the first stowed configuration and the second installation configuration, the coupling bracket 112 may be removed from the carrier bracket 110, rotated, and re-secured to the carrier bracket 110.

Figure 11:
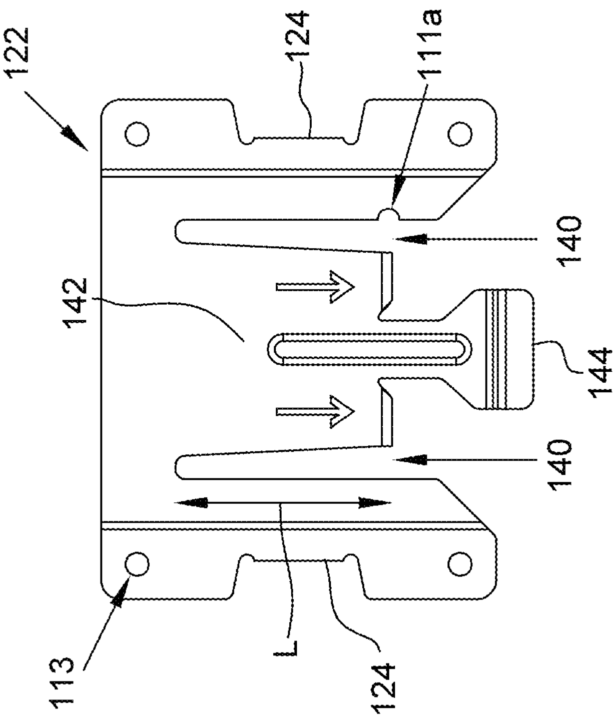
FIG. 11 is a top view of the receiver to FIG. 10, according to some embodiments.
Figure 10:
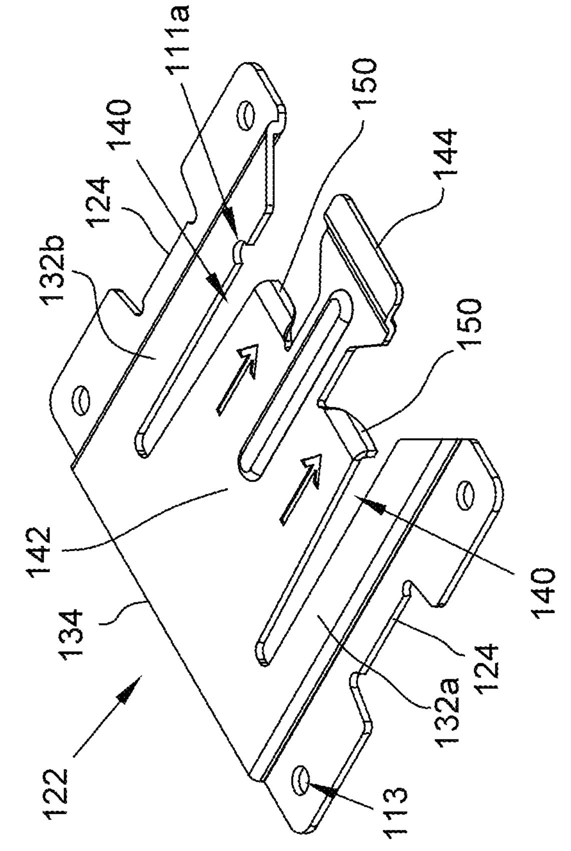
FIG. 10 is a top-oriented perspective view of the receiver of the carrier bracket of FIG. 7, according to some embodiments.
Figure 14:
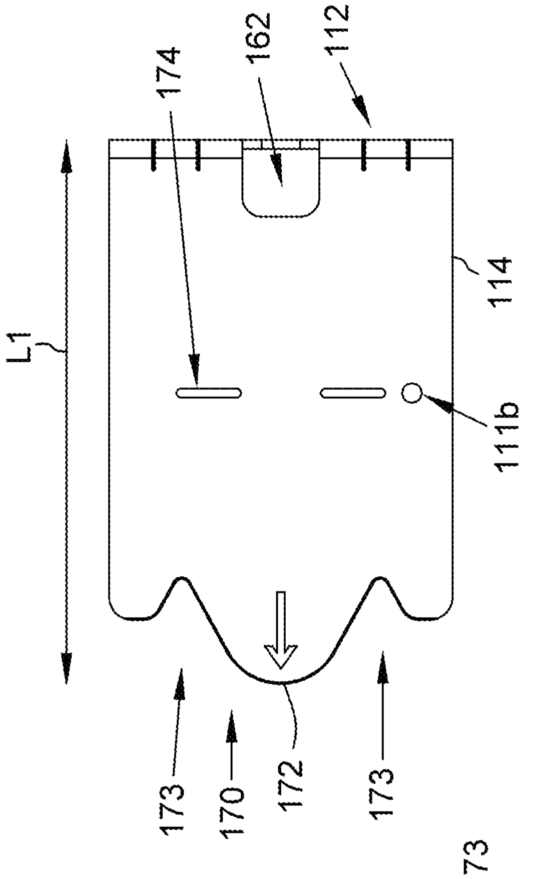
FIG. 14 is a bottom view of the coupling bracket of FIG. 13, according to some embodiments.
Figure 13:
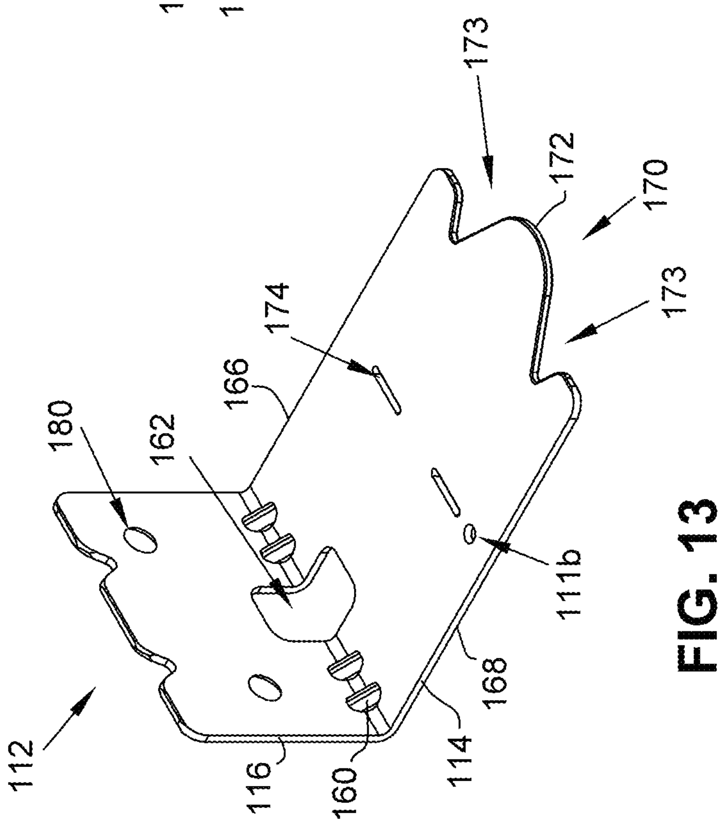
FIG. 13 is a top-oriented perspective view of the coupling bracket of the first anchoring clip of FIG. 4, according to some embodiments.

As shown in FIGS. 4 to 5, the first anchoring clip 102*a* may include an orientation feature 111 that gives an Installer visual indication that the coupling bracket 112 is properly engaged and seated within the carrier bracket 110 in the second, installation configuration, and that the first anchoring clip 102*a* is gauged to the correct wall depth. The orientation features 111 may be defined by a cutout within the carrier bracket 110 and a corresponding feature in the coupling bracket 112. As shown, the orientation features 111 can include a first orientation feature 111*a* defined by the carrier bracket 110 (e.g., as shown in FIGS. 10 to 11) and a second orientation feature 111*b* defined by the coupling bracket 112 (e.g., as shown in FIGS. 13 to 14) that is optionally complementary in shape to the first orientation feature 111*a*. The first orientation feature 111*a* may be an edge cutout or recess formed in an edge (e.g., a notch), or may be a stamp or marking on a surface of the carrier bracket 110, although any of a variety of orientation feature designs are contemplated. In turn, the second orientation feature 111*b* may be a curved or circular through hole, or aperture, for example, or may be a surface marking on a surface of the coupling bracket 112 (e.g., an etched or stamped fiducial marking), although a variety of orientation feature 111 designs are contemplated. In turn, Although the orientation features 111 are shown as curved or rounded features, other shapes such as rectangular, square, and triangular shapes are also contemplated.

In some embodiments, the first orientation feature 111*a* and the second orientation feature 111*b* align with each other when the first anchoring clip 102*a* is gauged to a standard wall depth of the rough opening (RO) framing. The standard wall depth is defined by both a depth of the wall/framing (e.g., a 2×4, a 2×6, or a 2×8 depth) and an exterior sheeting thickness (e.g., a ½-inch or 7/16-inch exterior sheeting thickness). In embodiments where the first anchoring clip 102*a* is gauged to a non-standard wall depth (e.g., any depth between the 2×4, 2×6, or 2×8 depths with exterior sheeting thickness), the orientation features 111 may not align with one another. Additionally, as further discussed below, an Installer may listen for an audible and/or tactile "click" between the carrier bracket 110 and the coupling bracket 112 during insertion of the coupling bracket 112 within the carrier bracket 110. The audible and/or tactile "click" indicates to the Installer that the first coupling bracket 102*a* is correctly gauged to the wall depth, and that the coupling bracket 112 is in a secure state with the carrier bracket 110.

Figure 7:
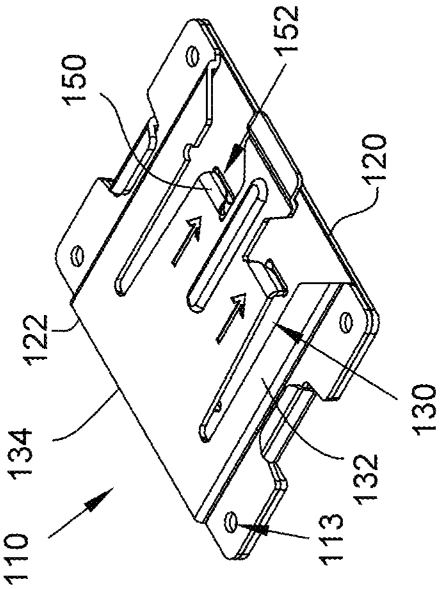
FIG. 7 is a top-oriented perspective view of a carrier bracket of the first anchoring clip of FIG. 4, according to some embodiments.

FIG. 7 is an isolated, isometric view of the carrier bracket 110, according to some embodiments. As shown, the carrier bracket 110 includes a backplate 120 and a receiver 122.

Figure 8:
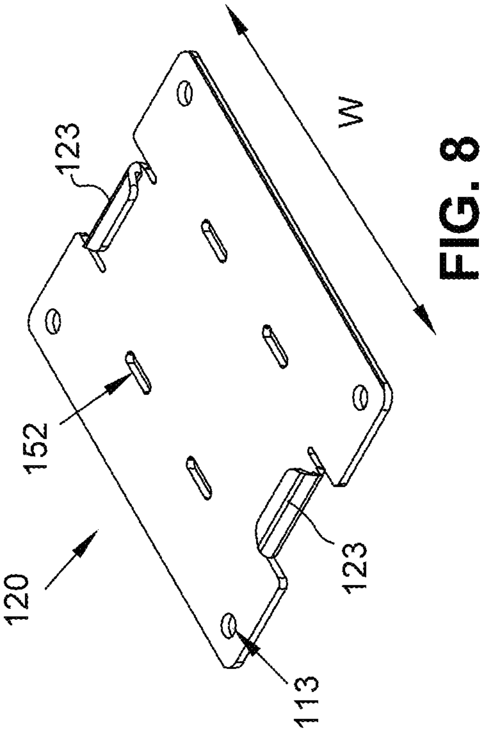
FIG. 8 is a top-oriented perspective view of a backing plate of the carrier bracket of FIG. 7, according to some embodiments.
Figure 9:
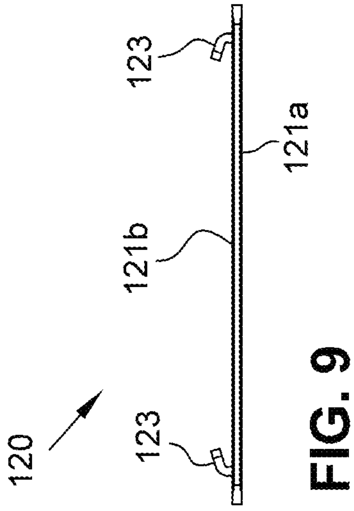
FIG. 9 is a side view of a backing plate of FIG. 8, according to some embodiments.

FIGS. 8 to 9 show the backplate 120 isolated from the carrier bracket 110, according to some embodiments. FIG. 8 shows an isometric view of the backplate 120 and FIG. 9 shows a profile view taken along a width W of the backplate 120. As shown, the backplate 120 may be sandwiched between the frame 30 and the receiver 122. Said differently, the backplate 120 may contact a portion of frame 30 on a first side 121*a* and contact a portion of the receiver 122 on a second side 121*b*. The backplate 120 is optionally secured to the receiver 122 using rivets, welding, adhesives, co-casting, overmolding, or other methods. As shown, the backplate 120 includes a lip 123 that projects outwardly and extends over a portion 124 of the receiver 122 (FIG. 11), which may help maintain the receiver 122 and backplate 120 coupling during insertion of the coupling bracket 112. In some embodiments, both the receiver 122 and the backplate 120 may include the one or more fastener apertures 113 that align to receive fasteners therethrough for coupling to the frame 30. If a lower profile is desired, in some embodiments, the backplate 120 may be omitted from the carrier bracket 110. In other lower profile embodiments, the frame 30 may define a recess and the backplate 120 may be received within the recess. In configurations without a backplate 120, surface features of the frame 30 (e.g., grooves or ridges) may interfere with smooth sliding and thus the backplate 120 is typically included notwithstanding the additional thickness.

Figure 12A:
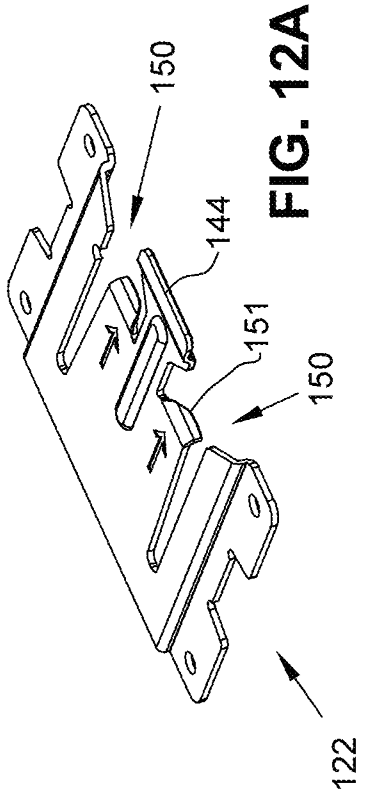
FIG. 12A is a side-oriented perspective view of the receiver of FIG. 10, according to some embodiments.
Figure 12B:
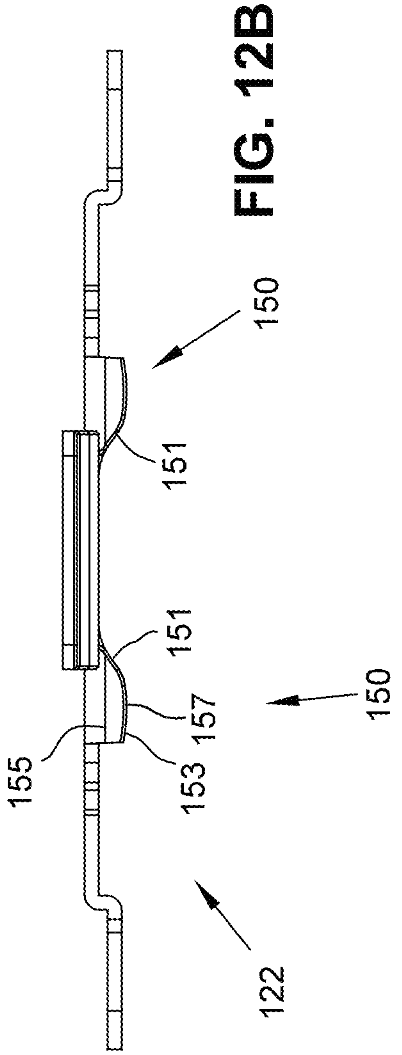
FIG. 12B is a front-oriented cross-sectional view of the receiver of FIG. 10, according to some embodiments.
Figure 12C:
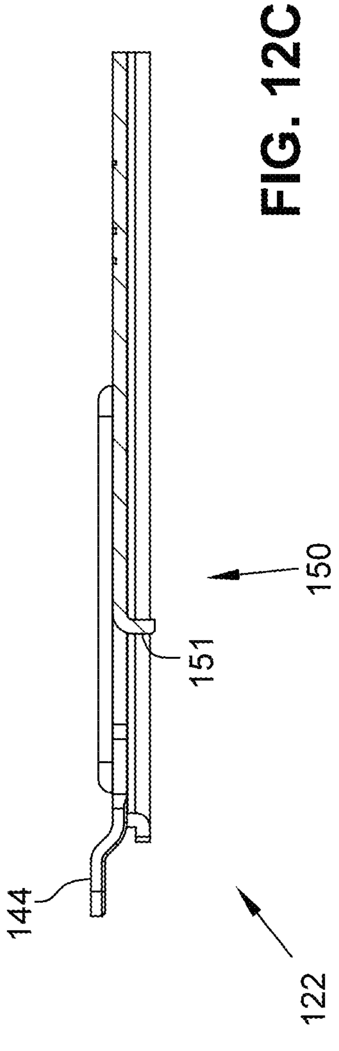
FIG. 12C is a side-oriented cross-sectional view of the receiver of FIG. 10, according to some embodiments.

FIGS. 10 to 12C show the receiver 122 isolated from the carrier bracket 110, according to some embodiments. FIG. 10 shows a top-oriented isometric view, FIG. 11 shows a top view, FIG. 12A shows a side-oriented prospective view, FIG. 12B shows a front cross-sectional view, and FIG. 12C shows a side cross-sectional view. As shown, the carrier bracket 110 defines a retaining pocket 130 for receiving the coupling bracket 112. In particular, the retaining lip 132 and the optional backplate 120 define the retaining pocket 130 therebetween. Where the backplate 120 or analogous structure is not included, the retaining pocket 130 may be defined by the receiver 122 and the portion of the fenestration unit 10 underlying the first anchoring clip 102*a* (e.g., a portion of the perimeter P of the frame 30).

The receiver 122 has a retaining lip 132 and a retention member 134. The retaining lip 132 acts as both a guide and a retainer under which the coupling bracket 112 may be slid. The retaining lip 132 may define a first side portion 132*a* and a second side portion 132*b* toward the edges of the retaining pocket 130 for securing corresponding portions of the coupling bracket 112. The first side portion 132*a* and the second side portion 132*b* may be raised relative to an outer perimeter, or outer edge portion, of the receiver 122 to receive a portion of the coupling bracket 112. As referenced above, the first orientation feature 111*a* may be defined on at least one of the first and second side portions 132*a*, 132*b* by a curved cutout. The cutout may be the shape of half circle, as shown, or take any of a variety of shapes (e.g., triangular, square, or others). The first orientation feature 111*a* may additionally or alternatively be a surface feature (e.g., etching, stamping, embossing) or marking (ink, paint, or the like) as desired.

The retention member 134 may be formed by a portion of the retaining lip 132. As shown in FIGS. 10 to 11, the receiver 122 includes a pair of cutouts 140 forming a flex tab 142 of the retention member 134 that is resiliently deflectable and spring-loaded. When receiving the coupling bracket 112, the retention member 134 may lift away from the frame 30 to create space within the retaining pocket 130 for the coupling bracket 112. The movement of the retention member 134 may cause stress on the carrier bracket 110, and the pair of cutouts 140 may be shaped to relieve, or reduce the amount of stress applied to the retention member 134 when receiving the coupling bracket 112. For example, the pair of cutouts 140 have a length L1 and width that may be configured to protect the retention member 134 from yielding during insertion of the coupling bracket 112. The cutouts 140 may be selected such that the insertion force required to be applied to the carrier bracket 110 in order to insert the coupling bracket 112 does not exceed 10 lbs, optionally 9 lbs, optionally 8 lbs, optionally 7 lbs, optionally 6 lbs, optionally 5 lbs, optionally 4 lbs, optionally 3 lbs, optionally 2 lbs, or even optionally 1 lb or less.

Although insertion force to insert the coupling bracket 112 into the carrier bracket 110 are relatively low, in various examples the coupling bracket 112 and the carrier bracket 110 form a strong mechanical interlock with each other that is generally not susceptible to inadvertent release or decoupling. The strong mechanical interlock helps keep the coupling bracket 112 coupled within carrier bracket 110 (e.g., within the retaining pocket 130). When the anchoring clip 102*a* is in the second, installation configuration, and anchored to the rough opening framing, the first anchoring clip 102*a* provides wind-load resistance to the fenestration unit 10.

As shown in FIGS. 12A to 12C, the retention member 134 further includes one or more catches 150, also described as a tooth 150 or a pawl 150, for engaging with the coupling bracket 112. In various examples, the catches 150 include features for reducing drag on the coupling bracket 112 during insertion into the carrier bracket 110. The one or more catches 150 may define a ramp edge 151 on an inner edge portion of the catches 150 that extends between a first end 153 of the catches 150 and a second end 155 of the catches 150. The ramp edge 151 may be sloped, or curved, inward to engage a portion of the coupling bracket 112 during insertion into the carrier bracket 110. For example, the one or more catches 150 may engage an insert guide 172 (FIG. 13) on the coupling bracket 112 (e.g., as shown in FIGS. 13 to 14) to encourage the coupling bracket 112 to correctly seat within the carrier bracket 110 (e.g., self-loading). The insert guide 172 may contact the ramp edge 151 of the one or more catches 150 during insertion, as further described below. The second end 155 of the catches 150 may be sloped or curved and define an engagement edge 157. The curved engagement edge 157 helps reduce friction between the carrier bracket 110 and the coupling bracket 112 during engagement by reducing instances of sharp corners (e.g., as opposed to an orthogonal extending catch 150) dragging along a surface of the coupling bracket 112 during insertion of the coupling bracket 112 into the carrier bracket 110. This reduction of friction helps keep insertion forces low (e.g., so as to not exceed 8 lbs).

In use, the flex tab 142 may be outwardly deflected to release, or translate, the one or more catches 150 in an outward direction, and once released the flex tab 142 will resiliently flex back into its original position. As shown in FIG. 8, the backplate 120 may include one or more receiving slots 152. To minimize stress forces on the receiver 122, the receiver 122 is kept in a relatively flat configuration relative to a longitudinal axis in both the first, stowed configuration and second, installation configuration. The one or more receiving slots 152 may assist in maintaining the receiver 122 in the relatively flat configuration. In some embodiments, the one or more catches 150 may have a length that contacts the backing plate 120. In such embodiments, the receiving slots 152 may receive a portion of the ends of the one or more catches 150 to maintain the receiver 122 in a relatively flat orientation. In other embodiments, the one or more catches 150 may be shorter such that they do not contact the backplate 120 and are not received by the receiving slots 152. In general, differences in the length of the one or more catches 150 may be due to machine tolerances, and the receiving slots 152 may correct for the differences in length to keep the receiver 122 relatively flat. These receiving slots 152 may enhance the overall resistance to pullout forces that the retention member 134 may have exerted upon it without the coupling bracket 112 being released.

The retention member 134 further includes a release handle 144 that projects relative to the flex tab 142. For example, the release handle 144 may be oriented to project toward the front, or interior side, of the frame 30, the release handle 144 being operable to be lifted away from the frame 30 to actuate, or release, the retention member 134 from one or more of the detents 174 of the coupling bracket 112 (e.g., as shown in FIGS. 13 to 14). Actuation of the release handle 144 allows an installer to easily transition the first anchoring clip 102*a* between the stowed configuration and the deployed configuration.

Figure 15:
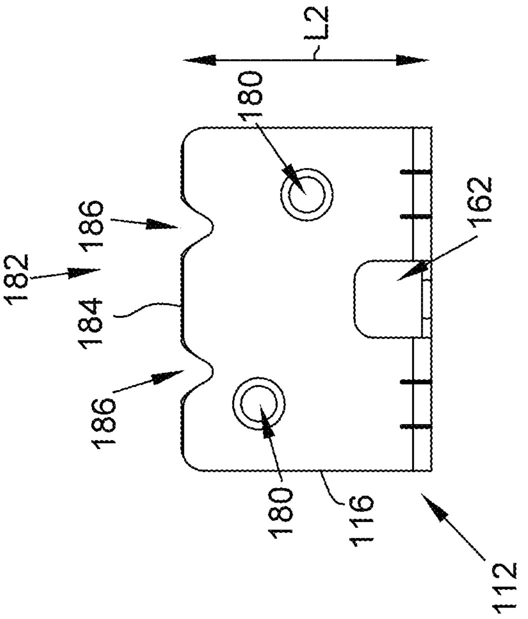
FIG. 15 is a rear-side view of the coupling bracket of FIG. 13, according to some embodiments.

FIG. 13 shows an isometric view of the coupling bracket 112 isolated from the first anchoring clip 102*a*, according to some embodiments. As shown, the coupling bracket 112 includes a first leg 114 and a second leg 116 extending from the first leg 114 and an angular offset (e.g., at an approximately orthogonal angle). The angular offset (e.g., orthogonal offset) of the first leg 114 and second leg 116 may help improve accuracy in gauging a wall depth of the rough opening framing. During installation, because the second leg 116 sits along an interior side of the rough opening framing, the coupling bracket 112 is held flush against the perimeter of the rough opening framing during a wall depth measurement and may act as a datum, or an anchoring point. In various examples, the first leg 114 and the second leg 116 are pre-bent prior to an installation process (e.g., at a remote location by a manufacturer as part of the forming process of the first and second legs 114, 116). FIG. 14 shows a bottom view of the first leg 114 and FIG. 15 shows a rear view of the second leg 116. As shown, the first and second legs 114, 116 may have one or more gussets 160 or other reinforcing features to help reinforce the first and second legs 114, 116 against relative bending and retain the orthogonal angle offset.

The one or more gussets 160 may also create a space (e.g., an air space or gap) between the frame 16 and the face of the coupling bracket 112. This space or gap may help prevent damage (e.g., abrasion) to the coupling bracket 112 or the frame 30 when shipped in the stowed configuration (FIG. 1), may make the coupling bracket 112 easier to access for removal from the stowed configuration, or may have other advantages. When the first anchoring clip 102*a* is the installation configuration (FIG. 2), a marking 161 created by the one or more gussets 160 may be visible on the perimeter of the frame 30 (e.g., at an edge of the frame 30) that acts as a visual indicator of the location of the first anchoring clip 102*a*. For example, during assembly in the installation configuration, the gussets 160 may be pressed into the edge of the frame to provide visual indicators as to the anchoring clip location (e.g., vertically) along the frame. The marking 161 may be used by a downstream installer (e.g., a carpenter) for ease of locating the first anchoring clip 102*a* after the fenestration unit 10 has been installed (e.g., the anchoring clip may be difficult to see after drywall installation or other finishing, and a carpenter may wish to avoid driving nails, screws, or other fasteners into the anchoring clip(s)).

As mentioned, the first anchoring clip 102*a* is configured to be transitioned from the stowed configuration to the installation configuration. In the first, stowed configuration, the first leg 114 is slidably received by the carrier bracket 110 and the second leg 116 may instead extend along a portion of the fenestration unit 10 (e.g., extend in the opposite direction from the second, installation configuration). In the second, installation configuration, the first leg 114 is slidably received by the carrier bracket 110 such that the second leg 116 is configured to be secured to framing surrounding a rough opening (RO) in a building structure using one or more fasteners (e.g., nails or screws). The fasteners may be received through the one or more fastener apertures 180 defined through a thickness of the second leg 116. In the second, installation configuration, the second leg 116 may be configured to rest flat against the rough opening framing when the fenestration unit 10 is installed within the rough opening (RO). The anchoring clip(s) may thereby be used to ensure proper registration, or depth of installation of the fenestration unit in the rough opening (RO).

The anchoring clip(s) may be reversible by design. For example, the first and second legs 114, 116 may be reversible in function wherein both the first and second legs 114, 116 are configured to be slidably received by the carrier bracket 110 and both are configured to be secured to framing surrounding the rough opening (RO). If desired, the two legs may be gauged to different size wall depths, providing greater overall flexibility to the anchoring clip(s).

In various embodiments, the first anchoring clip 102*a* may be packaged in the first, stowed configuration for shipping. The first, stowed configuration helps to protect the first anchoring clip 102*a* during shipping and may require less packaging compared to scenarios in which the first anchoring clip 102*a* is shipped in the second, installation configuration and/or separately from a remainder of the fenestration unit 10. Upon receipt, and prior to or during installation of the fenestration unit 10, the first anchoring clip 102*a* may be transitioned from the first, stowed configuration to the second, installation configuration.

The second leg 116 of the coupling bracket 112 optionally includes a release aperture 162 through a thickness of the second leg 116. As can be visualized with reference to FIGS. 4-6, the release handle 144 is accessible (e.g., using a screwdriver or other tool) through the release aperture 162 from the interior, or front side of the fenestration unit 10. The release aperture 162 may also extend into the first leg 114, as shown. The release aperture 162 is generally positioned at the intersection, or corner of between the first and second legs 114, 116.

As shown, the first leg 114 has first and second edges 166, 168 that are opposite one another, a length L1, and a leading end 170 at one end of the length L1 including an insert guide 172 in the form of a rounded projection. The insert guide 172 may assist with aligning and inserting the first leg 114 into the carrier bracket 110 as the leading end 170 is inserted into the carrier bracket 110. As shown, the coupling bracket 112 may be received at a generally central position within the retaining pocket 130. Where the coupling bracket 112 is inserted at a lateral angle relative to the generally central position (e.g., off axis-loading) the ramp edge 151 may contact the insert guide 172 and correct alignment between the carrier bracket 110 and the coupling bracket 112. The contact between the ramp edge 151 and insert guide 172 helps guide the coupling bracket 112 to the generally central, axially aligned position within the retaining pocket 130. In some embodiments, upon insertion, the insert guide 172 engages the one or more catches 150 of the carrier bracket 110 to raise the receiver 122 and self-load within the retaining pocket 130. In particular, upon insertion of the coupling bracket 112 within the carrier bracket 110, the insert guide 172 may engage the ramp edge 151 (FIGS. 12A to 12C) of the one or more catches 150 by sliding under opposing edges of the ramp edge 151, which in turn, raises the retention member 134 of the receiver 122 and allows the coupling bracket 112 to self-load within the retaining pocket 130. The curved engagement edge 157 minimizes contact with the surface of the coupling bracket 112 during insertion within the carrier bracket 150. This action helps to maintain the low insertion force that does not exceed approximately 8 lbs. The insert guide 172 may also define a recessed portion 173 on either side of the insert guide 172 that helps reduce friction upon insertion of the coupling bracket 112 within the carrier bracket 110 by helping ensure the one or more catches 150 minimally contact the coupling bracket 112 prior to the insert guide 172 lifting the carrier bracket 110. Additionally, the lifting of the receiver 122 due to engagement of the insert guide 172 and the ramp edge 151, and the curved engagement edge 157, help minimize contact and friction between the coupling bracket 112 and the carrier bracket 110. In some embodiments, including embodiments where the first and second legs 114, 116 are reversible in function, both the first leg 114 and the second leg 116 may include the insert guide 172.

The first leg 114 also has one or more detents 174 (a pair of first detents 174*a* as shown) at one or more longitudinal positions along the length L1 of the first leg 114. The one or more detents 174 may take the form of slots through the thickness of the first leg 114 as shown, but other configurations (e.g., partial depth detents) may also be employed. The one or more detents 174 may receive the one or more catches 150 of the carrier bracket 110 when the first anchoring clip 102*a* is in the second, installation configuration. The one or more longitudinal positions of the one or more detents 174 are selected according to a desired offset, or pre-selected depth, of the second leg 116 from the front face 42 of the frame 30 when the coupling bracket 112 is in the second, installation configuration. The desired offset, or pre-selected depth may generally correspond to the wall depth of the rough opening (RO) framing and the exterior sheeting thickness, as described above. In the embodiment of FIGS. 13 to 14, the one or more detents 174 are positioned for gauging against a standard 2×4 wall depth. In other embodiments, such as shown in FIG. 25, multiple pairs of detents 174 may be present along the length L1 of the first leg 114 for adjustability at different wall depths, including non-standard wall depths. In some embodiments, such as those shown in FIGS. 22-27, the coupling bracket 112 may include a plurality of detents positioned at increments (e.g., ⅛-inch increments or less) along a portion of the length of the first leg 114.

The second leg 116 defines one or more fastener apertures 180 configured to receiver one or more fasteners (not shown), such as screws or nails. The second leg 116 also has a length L2, which may be selected to ensure sufficient overlap with the framing surrounding a rough opening (RO) (not shown) to ensure the fasteners are able to bite into the framing. The fastener apertures 180 may be recessed or countersunk in order to allow screw heads to be mounted flush. In this way, the fasteners will not interfere with drywall or other wall treatments installed over the second leg 116.

The second leg 116 may include a tab 182 on one side of the length L2. The tab 182 may include a center portion 184 and define one or more recessed portions 186 on either side of the center portion 184. In some embodiments, the center portion 184 of the second leg 116 has a different shape than the insert guide 172 of the first leg 114 such that the installer can quickly visualize whether the first anchoring clip 102*a* is in the first, stowed configuration or the second, installation configuration. The shape of tab 182 may also be used to visually and/or tactilely distinguish between different coupling bracket embodiments, such as coupling bracket 212 (FIG. 19) and/or coupling bracket 312 (FIG. 25), where the shape of each tab is different. For example, tab 182 of coupling bracket 112 may be a different shape than tab 282 (FIG. 21) of coupling bracket 212 and may be a different shape than tab 382 (FIG. 27) of coupling bracket 312. Using different shapes may allow an installer to quickly distinguish which of the coupling brackets 112, 212, or 312 is installed.

The coupling bracket 112 may be fastened to the rough opening (RO) and removed from the rough opening (RO) without damaging the components of the coupling bracket 112. The coupling bracket 112 may be removed from the rough opening (RO) using standard tools (e.g., a screwdriver). The one or more fastener apertures 180 may be placed at different lengths along the second leg 116 to account for differences in drywall thickness and lengths of different spaces between the frame 30 and the rough opening (RO).

In FIGS. 4 to 6, the first anchoring clip 102*a* is in the installation configuration, with the second leg 116 of the coupling bracket 112 projecting outwardly relative to the carrier bracket 110. As shown, the first leg 114 is sufficiently inserted into the retaining pocket 130 that the retaining lip 132 extends over the first leg 114. As shown, the first side portion 132*a* (FIG. 10) and the second side portion 132*b* (FIG. 10) of the retaining lip 132 are positioned toward the edges of the retaining pocket 130 and are secured over the edges of the coupling bracket 112. The one or more catches 150 (FIG. 10), also described as teeth 150, engage into the one or more detents 174 (the first pair of detents 174) of the first leg 114. As described above, the one or more catches 150 also optionally extend into the receiving slots 152 (FIG. 8) of the backplate 120. In order to release the catches 150 from the detents 174, a user may press against, or lift, the release handle 144 (FIG. 10) and flex the flex tab 142, thereby lifting the catches 150 from the detents 174.

As shown in FIGS. 1 to 3, the plurality of anchoring clips 102 are secured to the frame 30 at a desired depth from the front face 42 of the frame 30 (e.g., the carrier bracket 110 can be mounted flush or approximately flush to the front face 42 of the frame 30). The plurality of anchoring clips 102 are optionally secured proximate the tops and bottoms of the first and second jambs 34, 36, respectively, with two (2) additional anchoring clips 102 positioned on each of the first and second jambs 34, 36 at an intermediate position, respectively. In some embodiments, the plurality of anchoring clips 102 may be spaced apart at substantially similar intervals along the first and second jambs 34, 36 respectively.

In the second, installation configuration as shown in FIGS. 2 to 3, the second legs of each of the coupling brackets, including the second leg 116 of the coupling bracket 112 (FIG. 4), projects away from the center of the frame 30, outwardly from the perimeter P (FIG. 1) of the frame 30. In some embodiments, the second legs 116 extend substantially flush to the rough opening framing in the second, installation configuration. As shown in FIG. 1, when in the stowed configuration, the second leg 116 of each of the anchoring clips 102, including the second leg 116 of the coupling bracket 112 (FIG. 4), projects inwardly away from the perimeter P (FIG. 1) toward the center of the frame 30. In some embodiments, the second leg 116 extends substantially flush to the front face 42, or interior face 42 of the frame 30 when the coupling brackets 112 are in the stowed configuration.

Figure 17:
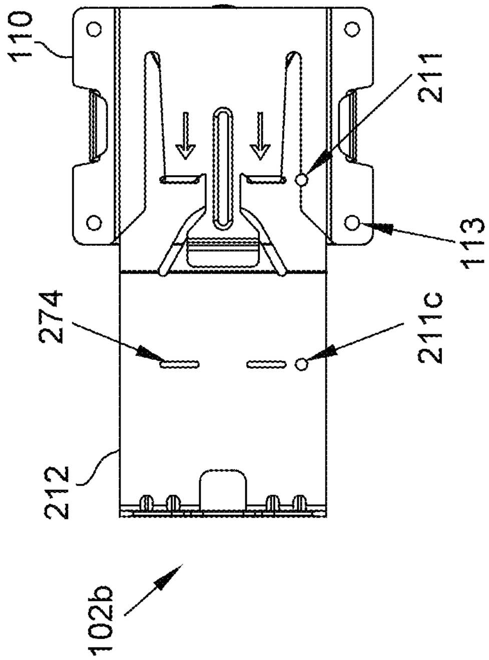
FIG. 17 is a top view of the first anchoring clip of FIG. 16, according to some embodiments.
Figure 18:
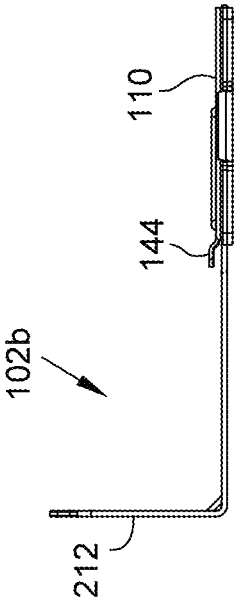
FIG. 18 is a side view of the first anchoring clip of FIG. 16, according to some embodiments.
Figure 16:
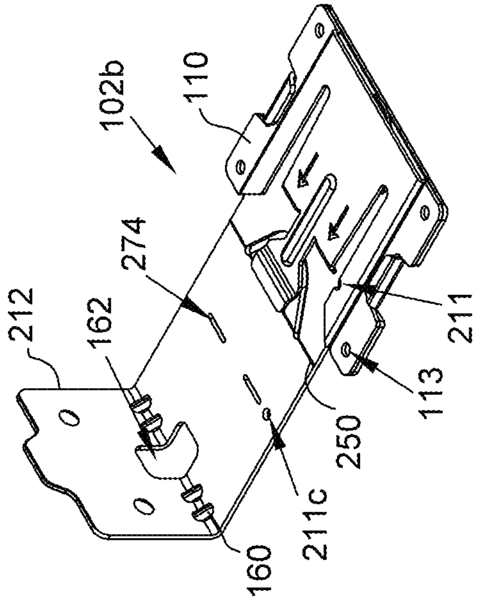
FIG. 16 is a top-oriented perspective view of another embodiments of a first anchoring clip of the anchoring system of FIG. 2, according to some embodiments.

FIGS. 16 to 18 show another design for the first anchoring clip in the form of first anchoring clip 102*b*. First anchoring clip 102*b* may include features similar to the first anchoring clip 102*a* of FIG. 4. FIG. 16 shows a top-oriented perspective view of the first anchoring clip 102*b*, FIG. 17 shows a top view of the first anchoring clip 102*b*, and FIG. 18 shows a side-view of the first anchoring clip 102*b*

As shown, the first anchoring clip 102*b* includes a carrier bracket 110 and a coupling bracket 212. The carrier bracket 110 of the first anchoring clip 102*b* may be substantially similar to the carrier bracket 110 of the first anchoring clip 102*a*, as described above. The same carrier bracket 110 may be compatible with a variety of coupling bracket designs, including the coupling bracket 112 of FIG. 13 and the coupling bracket 212 of FIG. 19.

Figure 20:
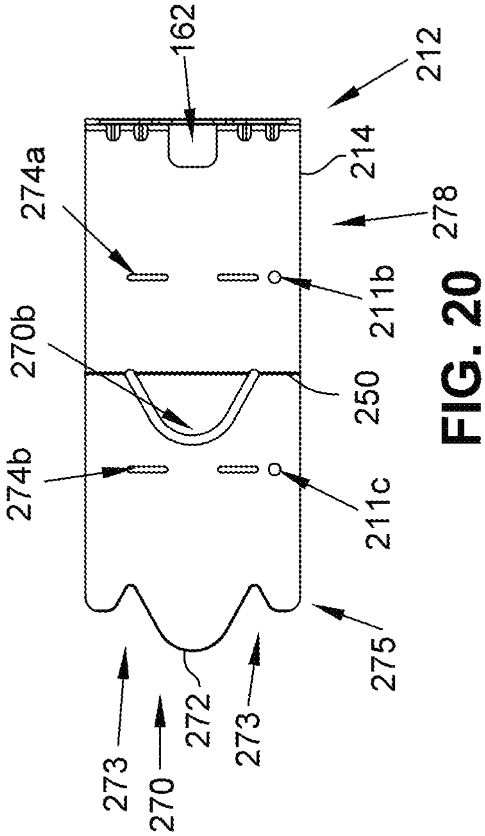
FIG. 20 is a bottom view of the coupling bracket of FIG. 19, according to some embodiments.
Figure 21:
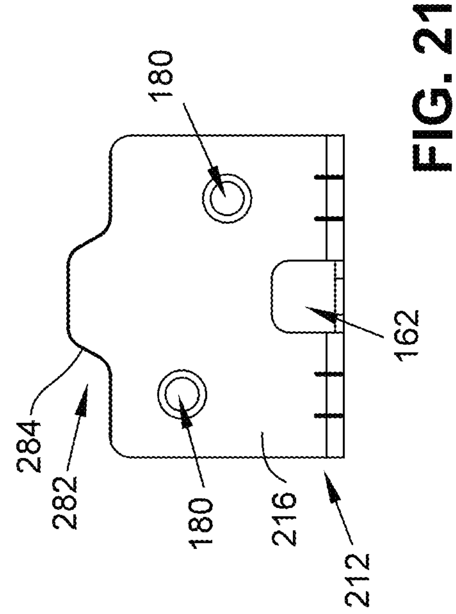
FIG. 21 is a rear-side view of the coupling bracket of FIG. 19, according to some embodiments.
Figure 19:
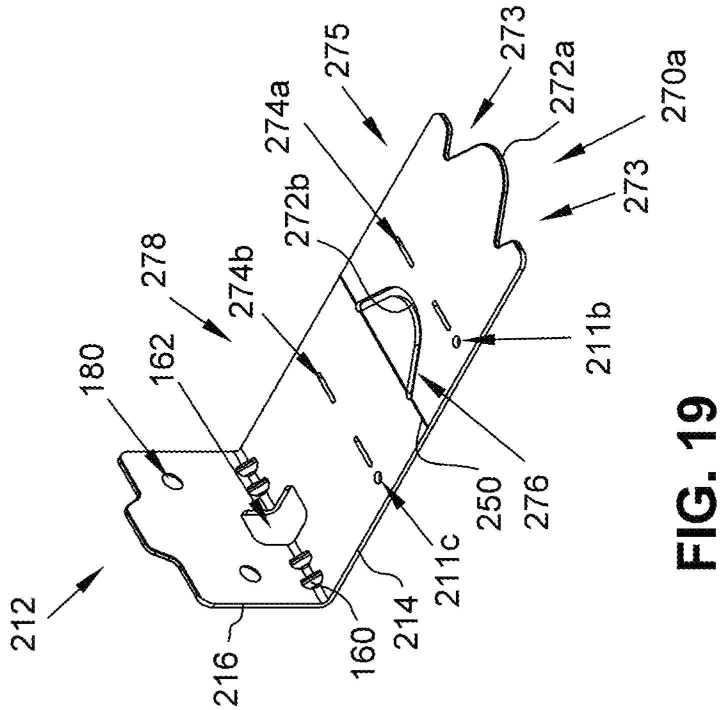
FIG. 19 is a top-oriented perspective view of the coupling bracket of the first anchoring clip of FIG. 16, according to some embodiments.

FIGS. 19 to 21 show the coupling bracket 212 isolated from the first anchoring clip 102*b*, according to some embodiments. The coupling bracket 212 may include features similar to the coupling bracket 112 of FIGS. 10 to 15. The coupling bracket 212 includes a first leg 214 and a second leg 216 extending from the first leg 214 and an angular offset (e.g., at an approximately orthogonal angle). FIG. 20 shows a bottom view of the first leg 214 and FIG. 21 shows a rear view of the second leg 216.

As shown, the first anchoring clip 102*b* may include one or more coin lines or indented lines 250 across at least a portion of the width of the first anchoring clip 102*b*. As shown, the indented line 250 is positioned along the width of the first leg 214, but the indented line 250 may be positioned along either of the first or second legs 214, 216. The indented line 250 may allow an installer to shorten the length of the first anchoring clip 102*b*. For example, after the installer reinserts the coupling bracket 212 into the carrier bracket 110, the coupling bracket 212 may extend too far away from the frame 30, which may affect the installation of features around the fenestration unit 10 such as additional drywall or paint. To shorten the coupling bracket 212, the installer may bend either the first leg 214 back-and-forth along the indented line 250 such that a first portion 275 of first leg 214 is broken off and removed. When the first portion 275 is removed, a second portion 278 remains for coupling to the carrier bracket 110. Shortening the coupling bracket 212 may increase adjustability of the first anchoring clip 102*b* to accommodate various wall depths as desired. For example, shorting the coupling bracket 212 may allow the coupling bracket to gauge against a shorter 2×4 wall depth instead of a longer 2×6 wall depth.

Similar to coupling bracket 112, the coupling bracket 212 includes a leading end 270*a* at one end including an insert guide 272*a* in the form of a rounded projection. The insert guide 272*a* may also define a recessed portion 273 on either side of the insert guide 272*a* that helps reduce friction upon insertion of the coupling bracket 212 within the carrier bracket 110 by helping to ensure the one or more catches 150 of the carrier bracket 110 minimally contact the coupling bracket 112. In examples where the first portion 275 of the first leg 214 is removed at the indented line 250, the first anchoring clip 102*b* may be configured substantially similar to the first anchoring clip 102*a*. For instance, removing a portion of the first leg 214 exposes a second leading end 270*b* positioned at the indented line 250. The second leading end 270*b* may define a second insert guide 272*b*, which is substantially similar to the insert guide 172. In some embodiments, the indented line 250 extends across the entire width of the first leg 214 such that the second insert guide 272*b* may be removed with the first portion 275 of the first leg 214. In other embodiments, the indented line 250 may extend discontinuously across only a portion of the width of the first leg 214 such that the second insert guide 272*b* remains coupled to the first anchoring clip 102*b* upon removal of the first portion 275. In such embodiments, the first leg 214 may define a relief portion 276 about the second insert guide 272*b*. The relief portion 276 may be defined through a thickness of the first leg 214 and may prevent the second insert guide 272*b* from being bent upon removal of the first portion 275.

As shown, the first anchoring clip 102*b* includes one or more detents 274, or one or more pairs of detents 274, along a length of the first leg 214. The one or more detents 274 may be substantially similar to the one or more detents 174 of the first anchoring clip 102*a* as described above. As shown, the first anchoring clip 102*b* includes a first pair of detents 274*a* and a second pair of detents 274*b*. In some embodiments, multiple pairs of detents 274 permit the retention member 134 of the carrier bracket 110 to be releasably locked at first and second offset distances from the front of the frame 30 as desired. For example, as shown in FIGS. 19 to 21, the second offset distance may be gauged to a 2×6 wall depth at the first pair of detents 274*a* and the first offset distance may be gauged to a 2×4 wall depth at the second pair of detents 274*b*, such that the first anchoring clip 102*b* is configured to accommodate different installation depths, for example to accommodate different thickness wall coverings (e.g., drywall, sheeting, and/or foam insulation) or fenestration unit features (e.g., jamb extended fenestration units or handles).

Similar to the first anchoring clip 102*a*, the first anchoring clip 102*b* may include at least one orientation feature 211 that gives the installer visual indication that the coupling bracket 212 is properly engaged and seated within the carrier bracket 110 when the first anchoring clip 102*b* is in the second, installation configuration, and that the first anchoring clip 102*b* is gauged to the correct wall depth. The carrier bracket 110 may include a first orientation feature, similar to the first orientation feature 111*a* described above. The coupling bracket 212 may define a second orientation feature 211*b* defined by the first portion 275 of the first leg 214 and a third orientation feature 211*c* defined by the second portion 278 of the first leg 214, both of which are complementary in shape to the first orientation feature 211*a*. The second and third orientation features 211*b* and 211*c* may be defined through a thickness of the first leg 214 and may be rounded, though other shapes are contemplated. In embodiments in which the first anchoring clip 102*b* is gauged to the 2×6 wall depth, the first orientation feature 111*a* of the carrier bracket 110 aligns with the second orientation feature 211*b* of the coupling bracket 212 (e.g., as shown in FIGS. 16 to 17). In embodiments in which the first anchoring clip 102*b* is gauged to the 2×4 wall depth, the first orientation feature 111*a* aligns with the third orientation feature 211*c* of the coupling bracket 212.

As shown in FIG. 21, the second leg 216 may include a tab 282 on one side of the length. In some embodiments, the shape of the tab 282 of the first anchoring clip 102*b* may be different than the shape of tab 182 (FIG. 15) of the first anchoring clip 102*a* such that an installer can quickly distinguish which of the first anchoring clips 102*a*, 102*b* is installed.

Figure 23:
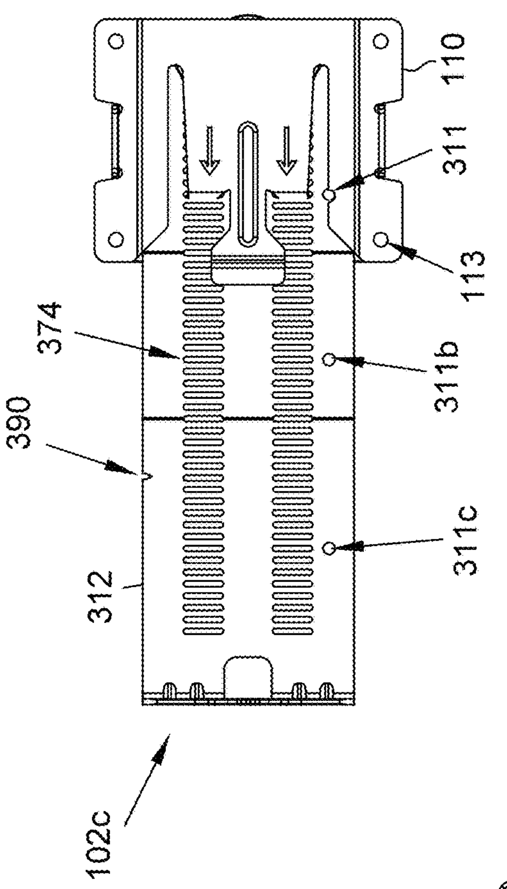
FIG. 23 is a top view of the first anchoring clip of FIG. 22, according to some embodiments.
Figure 22:
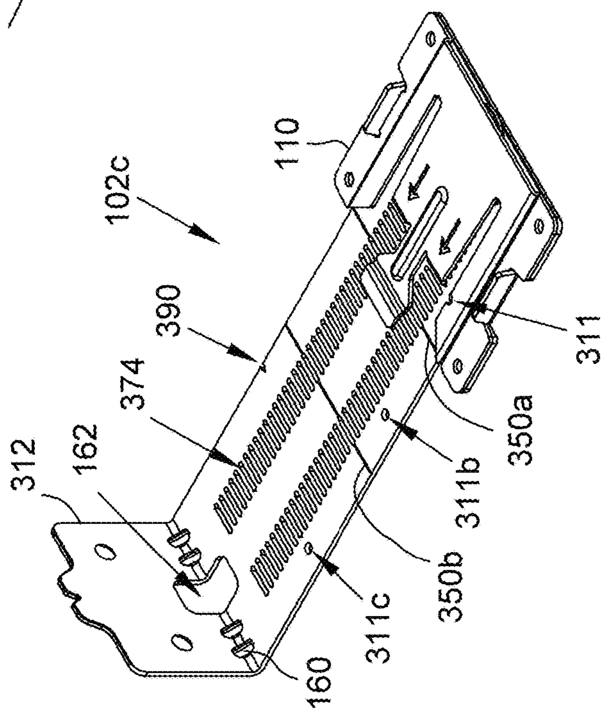
FIG. 22 is a top-oriented perspective view of an even further embodiment of a first anchoring clip of the anchoring system of FIG. 2, according to some embodiments.
Figure 24:
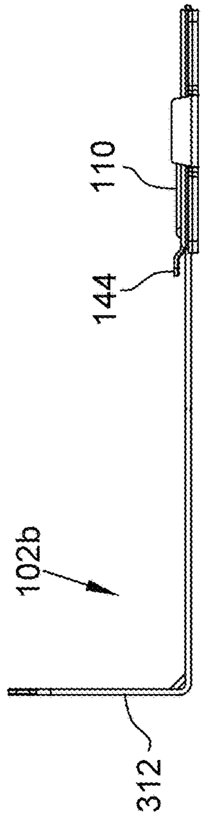
FIG. 24 is a side view of the first anchoring clip of FIG. 22, according to some embodiments.
Figure 25:
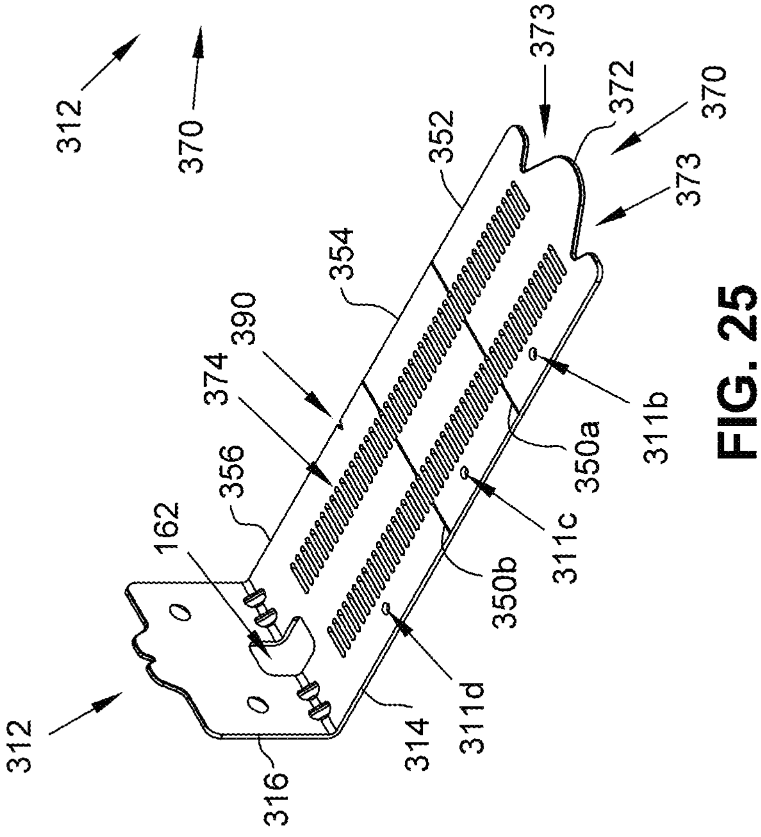
FIG. 25 is a top-oriented perspective view of the coupling bracket of the first anchoring clip of FIG. 22, according to some embodiments.

FIGS. 22 to 24 show another design for the first anchoring clip in the form of first anchoring clip 102*c*. The first anchoring clip 102*c* may include features similar to the first anchoring clip 102*a* of FIG. 4 and the first anchoring clip 102*b* of FIG. 16. FIG. 22 shows a top-oriented perspective view of the first anchoring clip 102*c*, FIG. 23 shows a top view of the first anchoring clip 102*c*, and FIG. 24 shows a side-view of the first anchoring clip 102*c*.

As shown, the first anchoring clip 102*c* includes a carrier bracket 110 and a coupling bracket 312. The carrier bracket 110 of the first anchoring clip 102*c* may be substantially similar to the carrier bracket 110 of the first anchoring clip 102*a*, as described above. The same carrier bracket 110 may be compatible with a variety of coupling bracket designs, including the coupling bracket 112 of FIG. 14, the coupling bracket 212 of FIG. 19, and the coupling bracket 312 of FIG. 25.

Figure 26:
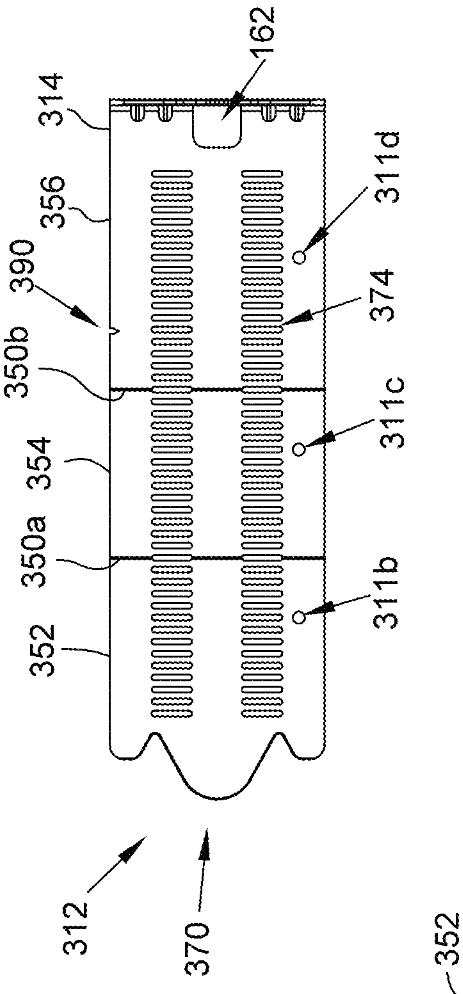
FIG. 26 is a bottom view of the coupling bracket of FIG. 25, according to some embodiments.
Figure 27:
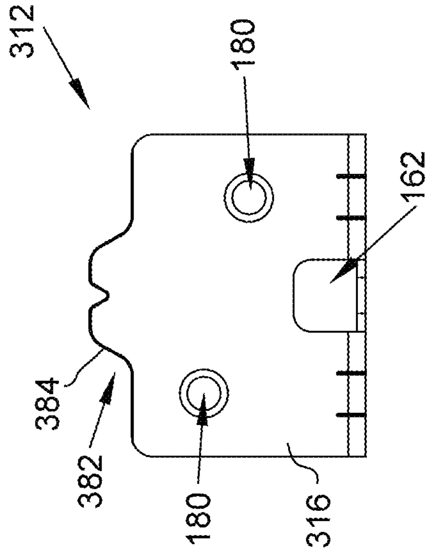
FIG. 27 is a rear-side view of the coupling bracket of FIG. 25, according to some embodiments.

FIGS. 25 to 27 show the coupling bracket 312 isolated from the first anchoring clip 102*c*, according to some embodiments. The coupling bracket 312 may include features similar to the coupling bracket 112 of FIGS. 13 to 15 and the coupling bracket 212 of FIGS. 19 to 21. The coupling bracket 312 includes a first leg 314 and a second leg 316 extending from the first leg 314 and an angular offset (e.g., at an approximately orthogonal angle). FIG. 26 shows a bottom view of the first leg 314 and FIG. 27 shows a rear view of the second leg 316.

As shown, the first anchoring clip 102*c* has a plurality of pairs of detents 374 along the length of the first leg 314. In some examples, the plurality of pairs of detents 374 permit the retention member 134 of the carrier bracket 110 to be releasably locked at first and second offset distances from the front of the frame 30 as desired. For example, the second offset distance may be approximately 0.125 inches greater than the first offset distance, such that the first anchoring clip 102*c* is configured to accommodate different installation depths, for example to accommodate different thickness wall coverings (e.g., drywall) or fenestration unit features (e.g., jamb extended fenestration units or handles). The pairs of detents 374 may be substantially similar to the detents 174 (FIG. 13) described with respect to the first anchoring clip 102*a*. For example, the plurality of pairs of detents 374 permit even further adjustability, across a plurality of depths at any desired increment (e.g., 0.0625 inches, 0.125 inches or other). In other embodiments, the number of plurality of pairs of detents 374 may be minimized to reduce error in installation (e.g., the plurality of pairs of detents 374 are spaced apart at greater than 0.125 inch increments). It can be desirable to minimize the number of pairs of detents 374 to help reduce instances where the first anchoring clip 102*a* is mistakenly gauged to an incorrect wall depth during installation. However, this may be a tradeoff in overall installation depth flexibility, and other designs may seek to maximize the number of pairs of detents 374.

As shown, the first anchoring clip 102*c* may be adjustable between a 2×8 wall depth, a 2×6 wall depth, a 2×4 wall depth, and non-standard wall depths therebetween. The first anchoring clip 102*c* may optionally include one or more coin lines, or indented lines 350, similar to the indented lines 250 of the first anchoring clip 102*b*, described above. As shown, the first anchoring clip 102*c* includes a first indented line 350*a* and a second indented line 350*b*, where both the first and second indented lines 350*a* and 350*b* are positioned along a width of the first leg 314. The first indented line 350*a* may be positioned between a first portion 352 of the first anchoring clip 102*c* and a second portion 354 of the first anchoring clip 102*c*. In embodiments where the installer bends the first indented line 350*a*, the first portion 352 may be removed and the length of the first anchoring clip 102*c* is shortened. In some embodiments, this allows the first anchoring clip 102*c* to be shortened to gauge against a 2×6 wall depth instead of a 2×8 wall depth, or a non-standard wall depth less than the 2×6 wall depth. The second indented line 350*b* may be positioned between the second portion 354 of the first anchoring clip 102*c* and a third portion 356 of the first anchoring clip 102*c*. In embodiments where the installer bends the second indented line 350*b*, the second portion 354 (and the first portion 352 if not previously removed) may be removed and the length of the first anchoring clip 102*c* is further shortened. In some embodiments, this allows the first anchoring clip 102*c* to be shortened to gauge against a 2×4 wall depth instead of a 2×6 wall depth, or a non-standard wall depth less than the 2×4 wall depth. Shortening the coupling bracket 312 may further permit the adjustability of the first anchoring clip 102*c*. The first anchoring clip 102*c* may further define a notch 390, or a slot 390, along a portion of the length of the first leg 314 to assist with gauging, which is further described below.

Similar to the first anchoring clips 102*a*, 102*b*, the first anchoring clip 102*c* may include at least one orientation feature 311 that gives the installer a visual indication that the coupling bracket 312 is properly engaged and seated within the carrier bracket 110 in the second installation configuration, and that the first anchoring clip 102*c* is gauged to the correct wall depth. The carrier bracket 110 may include a first orientation feature, similar to the first orientation feature 111*a* described above. The coupling bracket 312 may define a second orientation feature 311*b* defined through a thickness of the first portion 352 of the first leg 314, a third orientation feature 311*c* defined through a thickness of the second portion 354 of the first leg 314, and/or a fourth orientation feature 311*d* defined through a thickness of the third portion 356 of the first leg 314, all of which are complementary in shape to the first orientation feature of the carrier bracket 110. The second, third, and fourth orientation features 311*b*, 311*c*, and 311*d* may be rounded, though other shapes are contemplated. In embodiments in which the first anchoring clip 102*c* is gauged to the 2×8 wall depth, the first orientation feature 111*a* of the carrier bracket 110 aligns with the second orientation feature 311*b* of the coupling bracket 312 (e.g., as shown in FIGS. 22 to 23). In embodiments in which the first anchoring clip 102*c* is gauged to the 2×6 wall depth, the first orientation feature aligns with the third orientation feature 311*c* (e.g., similar to the configuration shown in FIG. 16). In embodiments in which the first anchoring clip 102*c* is gauged to the 2×4 wall depth, the first orientation feature 111*a* of the carrier bracket 110 aligns with the fourth orientation feature 311*d* (e.g., similar to the configuration shown in FIG. 4). In embodiments where the first anchoring clip 102*c* is gauged to a non-standard wall depth (e.g., between any of the 2×4, 2×6, and 2×8 wall depths), the orientation feature 311 may not be aligned. In such embodiments, the installers may listen for an audible cue, or a click, when the coupling bracket 312 engages the carrier bracket 110. The click may also indicate to the installer that the components of first anchoring clip 102*c* are properly engaged and gauged to the rough opening framing. Further details on the audible cue are included below.

As shown in FIG. 27, the second leg 316 may include a tab 382 on one side of the length. The tab 382 may include a center portion 384. The shape of the tab 382 may be different than the shape of tab 182 (FIG. 15) of the first anchoring clip 102*a* and the shape of tab 282 (FIG. 21) of the first anchoring clip 102*b* such that an installer can quickly distinguish which of the first anchoring clips 102*a*, 102*b*, 102*c* is installed. In some examples, the fenestration unit 10 is provided with a kit of differently configured anchoring clips (not shown), which may include a combination of first anchoring clips 102*a*, 102*b*, and 102*c*. The plurality of differently configured anchoring clips may be color coded, marked with numbering, lettering, or symbols, or otherwise identified by the tabs 182, 282, 382 to facilitate user selection of an appropriately-sized bracket for a particular installation depth of the fenestration unit 10 in the rough opening (RO).

Installation of the fenestration unit 10 can proceed in view of the various concepts described in the foregoing sections. In particular, installation of the fenestration unit 10 in the rough opening (RO) may proceed from the interior side of the rough opening (RO) and may be executed by a single installer on the interior side of the rough opening (RO).

As part of the installation process, the rough opening (RO) in the building structure should be prepared for fenestration unit 10 installation. Generally, the rough opening (RO) is sized to be between ½ inches and ¾ inches larger than the fenestration unit 10 in both width and height, although other setups may also be suitable. Some methods also include forming the rough opening (RO), such as by cutting out the rough opening (RO) (e.g., plywood cladding covering rough opening framing). The sill portion of the framing of the rough opening (RO) (lower framing) may be flashed (e.g., using appropriate flashing tape).

The fenestration unit 10 is then partially deployed from the stowed to the active configuration. In particular, the anchoring clips 102 (including any of first anchoring clips 102*a*, 102*b*, or 102*c*) are transitioned to the installation configuration by removing the coupling brackets 112, 212, or 312 from the carrier brackets 110, rotating them 180 degrees so they no longer extend inward toward the center of the fenestration unit 10, and then re-inserting the coupling brackets 112, 212, or 312 into the carrier brackets 110 such that the coupling brackets 112, 212, or 312 project radially outward from outer perimeter P of the frame 30. In various examples, in both the first, stowed configuration and the second, installation configuration, the first leg 114, 214, or 314 of the respective coupling brackets 112, 212, or 312 is received by the carrier bracket 110, and the respective second legs 116, 216, or 316 project relative to the perimeter P of the frame 30. In the first, stowed configuration, the first leg 114, 214, 314 projects inward relative to the perimeter P of the frame 30 (FIG. 1). In the second, installation configuration, the first leg 114, 214, 214 project outward relative to the perimeter P of the frame 30 (FIGS. 2-3). When the coupling brackets 112, 212, or 312 are sufficiently inserted into the carrier brackets 110 the catches 150 engage the detents 174. In various examples, this engagement results in an audible "click" or noise providing a clear, audible cue to the installer that the coupling brackets 112, 212, or 312 have been properly secured and are at the desired depth of insertion. This audible cue can be augmented by adjusting the spring bias and material selection for the anchoring clips 102. The "click" or vibration may also present as tactile feedback, keying to a user that the coupling brackets 112, 212, or 312 have been properly installed. In various embodiments, the transition between the first, stowed configuration and the second, installation configuration may be referred to as a "Flip and Click" where the coupling bracket 112, 212, 312 is removed from the carrier bracket 110, flipped 180 degrees, and inserted back into the carrier bracket 110 with an audible and/or tactile "click" indicating for the user that the coupling bracket is in a secure state. Additionally, one or more orientation features 111, 211, and 311 described above may offer a visual cue that the respective coupling bracket 112, 212, or 312 has been properly installed and gauged to the proper wall depth. In some embodiments where a non-standard wall depth is gauged (e.g., a wall depth between any of 2×4, 2×6, or 2×8), the orientation feature 111, 211, or 311 may not be available. Various details on insertion depth and assembly of the coupling brackets 112 are provided in the foregoing sections.

Figure 28:
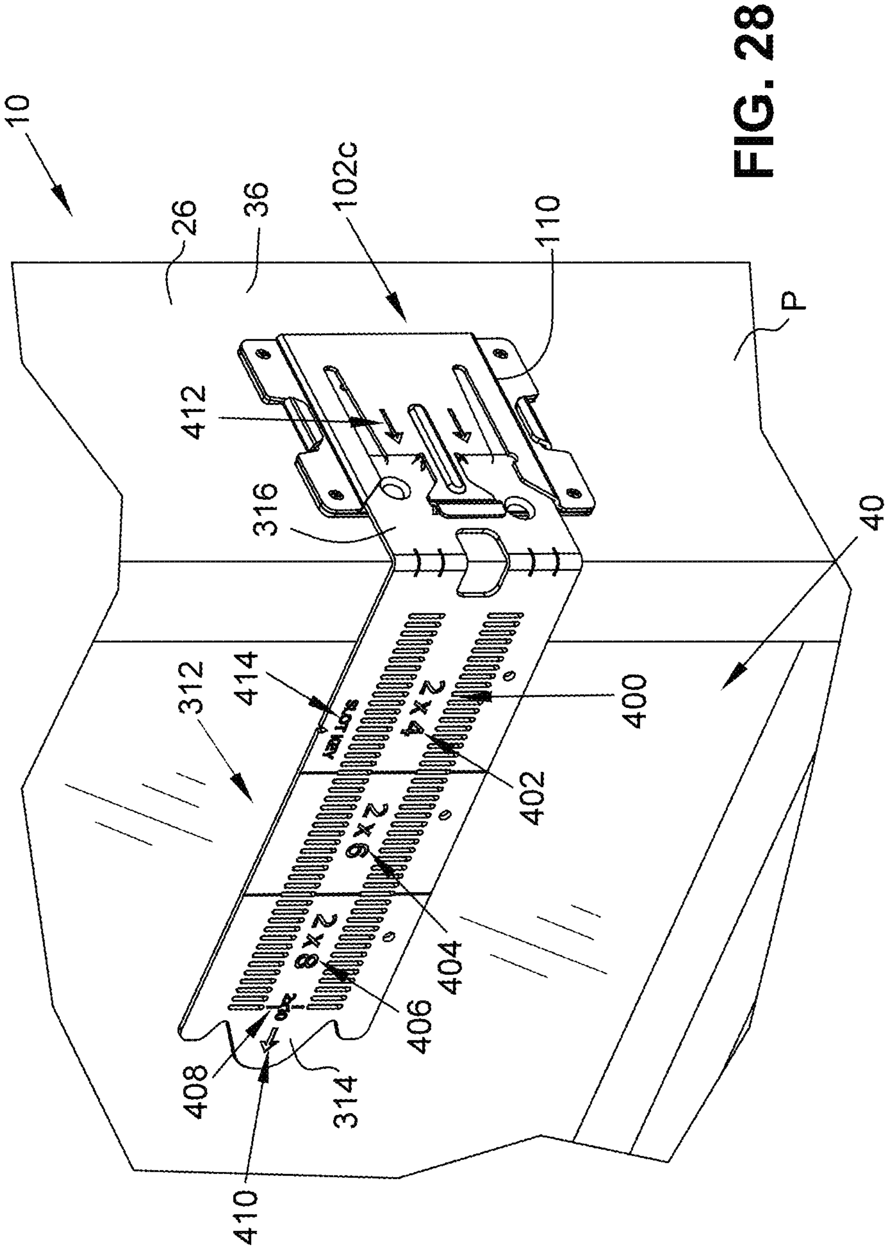
FIG. 28 is a side-oriented perspective view of the coupling bracket of FIG. 22 in a stowed configuration, according to some embodiments.

In the first, stowed configuration, the carrier bracket 112, 212, and 312 is positioned against the perimeter P of the frame 30 to minimize the profile of the fenestration unit 10 and protect the respective first anchoring clip 102 during shipping. As shown in FIG. 28, in embodiments where the first leg of the anchoring clip 102 is long and sized for gauging to 2×6 or 2×8 (e.g., first legs 214, 314), another first, stowed configuration can be used. The respective second leg 216, 316 may be inserted into the carrier bracket 110 such that the respective first leg 214, 314 extends inwardly along the perimeter P of the frame 30. This alternative first, stowed configuration helps ensure the carrier bracket 112 is positioned along the perimeter P of the frame 30 to minimize profile and minimize packaging in shipping. To transition to the second, installation configuration, respective second leg 216, 316 is removed from the carrier bracket 110 and the respective coupling bracket 212, 312 is rotated end-to-end such that the respective first leg 214, 314 is inserted into the carrier bracket 110 at a pre-selected depth (e.g., based on the wall depth of the rough opening (RO) framing and exterior sheeting thickness).

As shown in FIG. 28, the coupling bracket 312 may include one or more markings 400 defined along a length of the first leg 314 of the coupling bracket 312. The one or more markings 400 may include etchings, engravings, and/or stamped features. The one or more markings 400 may be defined on an external face of the first leg 314 such that the one or more markings 400 are visible to the Installer during installation. Although shown and described with respect to coupling bracket 312, similar features may also be included on coupling brackets 112, 212.

In some examples, the one or more markings 400 may correspond to a standard wall depth of the rough opening (RO) and indicate a length of the first leg 314 that corresponds with the standard wall depth. As shown, the one or more markings include a first marking 402 (e.g., "2×4"), an optional second marking 404 (e.g., "2×6"), and/or an optional third marking (e.g., "2×8") that correspond to 2×4, 2×6, and 2×8 wall depths, respectively. For example, the first marking 402 is positioned between the second coin line 350*b* (FIG. 22) and the second leg 316, indicating that the length of the first leg 314 between the second coin line 350*b* and the second leg 316 is gauged to a 2×4 wall depth. The Installer may use any of the first, second, and third markings 402, 404, 406 to assist with gauging of the first anchoring clip 102*c* during installation of the fenestration unit 10. The first leg 314 may also include a fourth marking 408 (e.g., "2×10") indicating that the maximum wall depth that can be gauged to has a 2×10 wall depth. The first leg 314 may also include a fifth marking 414 (e.g., "slot key") that indicates a position of the slot 390 on the first leg 314 for ease of identifying the slot's 390 position during installation.

The one or more markings 400 on the first leg 314 may also include one or more arrows 410, where the one or more arrows indicate an insertion direction of the coupling bracket 312 into the carrier bracket 110 in the second, installation configuration (FIGS. 2-3). The one or more arrows 410 may be positioned near the insert guide 372 (FIG. 25). Similarly, the carrier bracket 110 may include one or more arrows 412, where the one or more arrows 412 indicate where to insert the coupling bracket 312 within the carrier bracket 110. The one or more arrows 412 of the carrier bracket 110 may point in the opposite direction to the one or more arrows 410 of the coupling bracket 312 when the coupling bracket 310 is installed in the second, installation configuration.

Advantageously, in various implementations, no tools are needed for the foregoing steps. In other words, the removal, reversal, re-insertion, and coupling/assembly of the anchoring clips 102 can be accomplished by hand. If it is desired to remove the coupling brackets 112 from the carrier brackets 110 after the catches 150 have engaged the detents 174, a user may lift the catches 150 from the detents 174 using the release handle 144 (e.g., using by hand and/or by using a tool such as a screwdriver as previously described) and the coupling brackets 112 may then be withdrawn.

Figure 30:
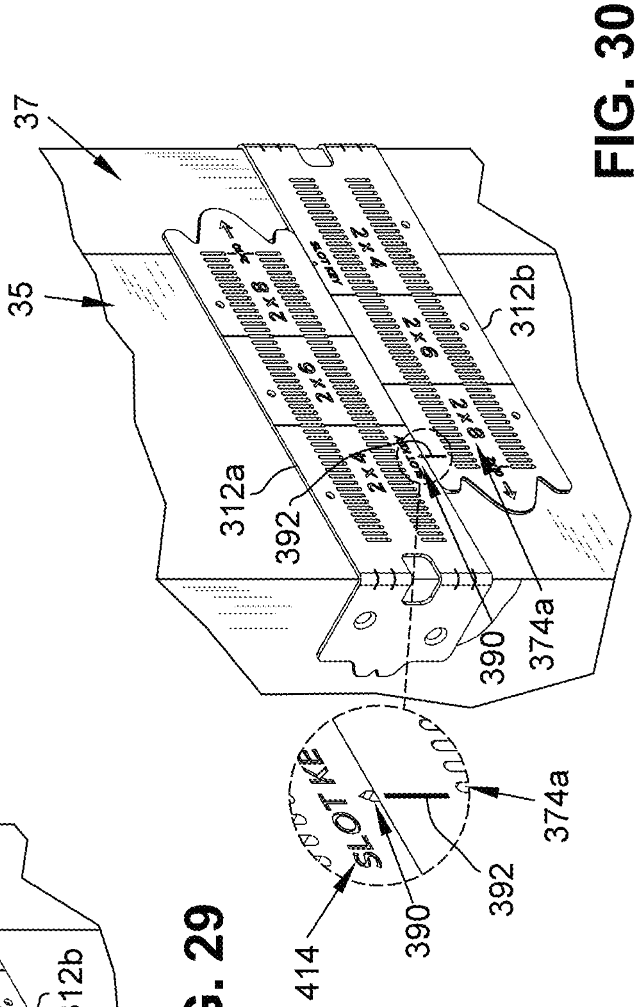
FIG. 30 is another side-oriented perspective view of the coupling bracket of FIG. 29 gauged against a rough opening framing, according to some embodiments.
Figure 29:
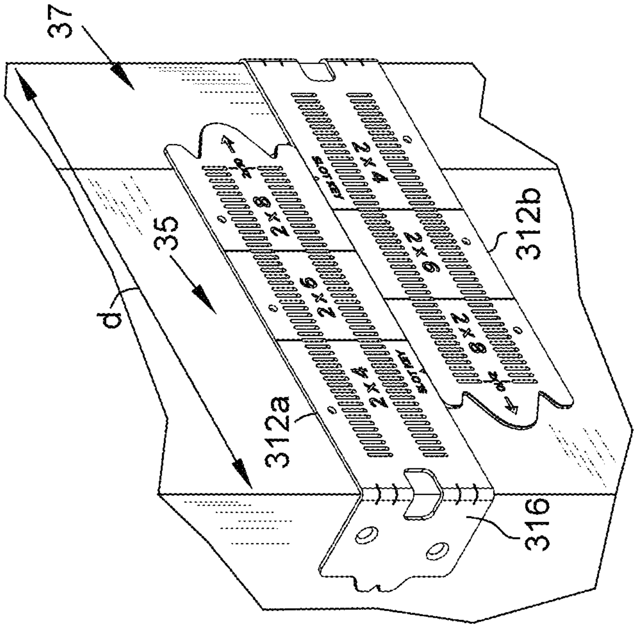
FIG. 29 is a side-oriented perspective view of the coupling bracket of FIG. 25 gauged against a rough opening framing, according to some embodiments.
Figure 31:
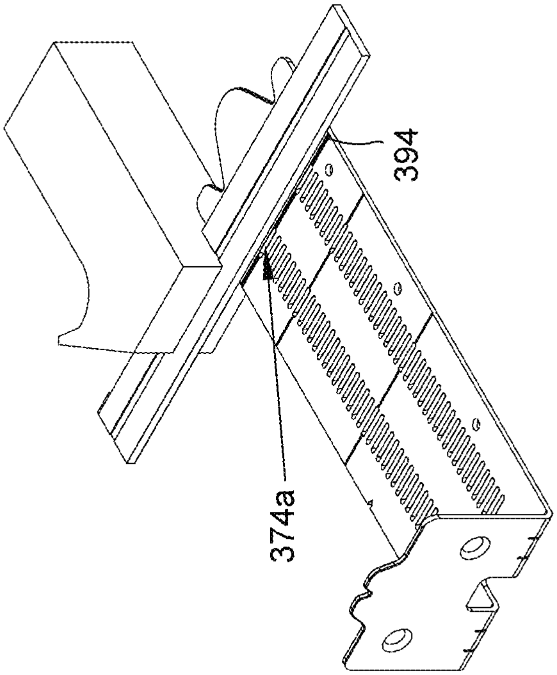
FIG. 31 shows the coupling bracket of FIG. 29 with a line drawn across the gauged depth, according to some embodiments.
Figure 32:
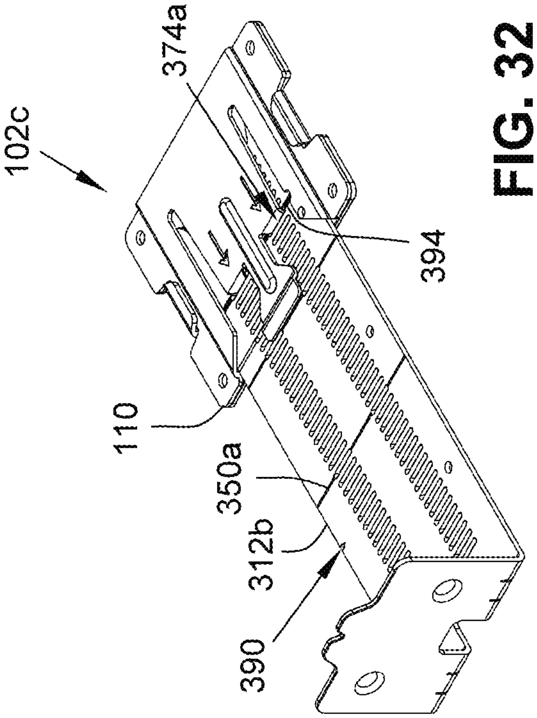
FIG. 32 shows the first anchoring clip of FIG. 29 gauged to the rough opening framing dimensions, according to some embodiments.
Figure 33:
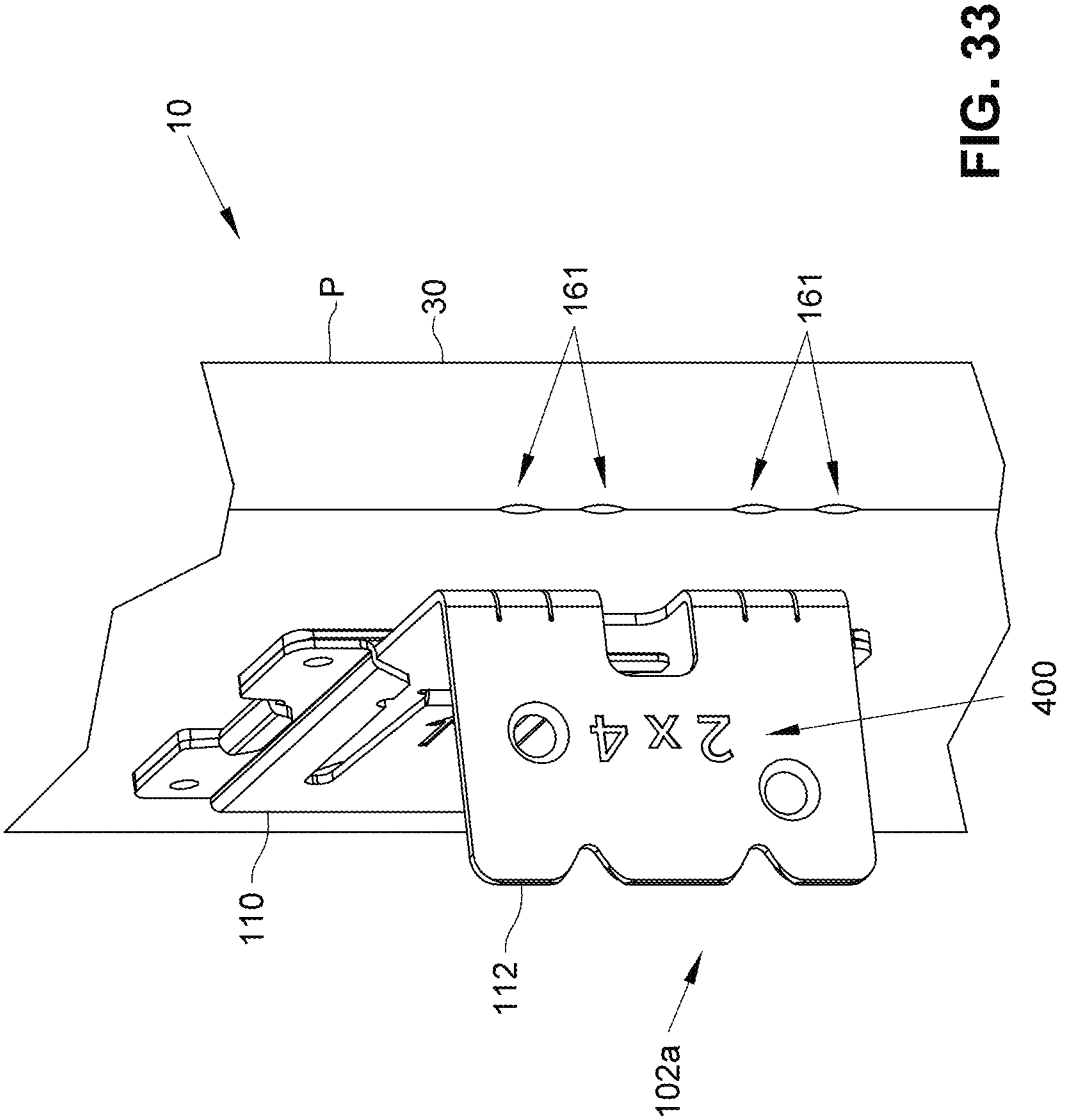
FIG. 33 shows a side-oriented perspective view of a marking on a perimeter of the fenestration unit, according to some embodiments.

In gauging the anchoring system 100 to a non-standard wall depth using first anchoring clips 102*c*, the slot 390 may be utilized. In one embodiment, as shown in FIG. 29, two (2) of the coupling brackets 312 (referred to herein as first and second coupling brackets 312*a* and 312*b*) may be placed against both the rough opening framing 35 and an optional foam insulation and/or exterior sheeting 37 such that both the first and second coupling brackets 312*a*, 312*b* extend across a full wall depth d. The optional foam insulation 37 may vary in thickness from between approximately ½-inch to approximately 2-inches thick, for example. The optional exterior sheeting 37 may vary in thickness from between approximately ⅜-inch to approximately ¾-inch thick, for example. The first and second coupling brackets 312*a*, 312*b* may be positioned such that they are facing opposite directions (e.g., such that the second legs 316 are positioned on opposing sides of the rough opening framing 35). The second leg 316 sits relatively flat along an interior side of the rough opening framing and help improve accuracy of gauging by keeping the first and second coupling brackets 312*a*, 312*b* flush against the rough opening framing. As shown in FIG. 30, a mark 392 may be drawn from the slot 390 of the first coupling bracket 312*a* to the detent 374*a* of the second coupling bracket 312*b* that is aligned with the slot 390. A position of slot 390 on the first coupling bracket 312*a* may generally correspond to a length or position of the carrier bracket 110 relative to the first coupling bracket 312*a* when the first leg 314 is received within the carrier bracket 110. The detent 374*a* is positioned at a desired insertion depth of the first coupling bracket 312*a* within the carrier bracket 110 to match the wall depth of the rough opening framing. A combination square tool, or another straightedge, may be used to draw a straight line 394 (FIG. 31) across a width of the second coupling bracket 312*b* through the pair of detents 374*a* of the second coupling bracket 312*b*. As shown in FIG. 32, the second coupling bracket 312*b* may then be coupled to the carrier bracket 110 such that the carrier bracket 110 engages the pairs of detents 374*a*. In some embodiments, as discussed above with respect to first anchoring clip 102*c*, since the straight line 394 is positioned within the second portion 354 of the second coupling bracket 312*b*, the first portion 352 of the second coupling bracket 312*b* may be removed at the first indented line 350*a* prior to coupling to the carrier bracket 110.

The fenestration unit 10 is inserted or pushed into the rough opening (RO) from the interior side of the rough opening (RO), for example by a single installer. The fenestration unit 10 may be passed from the exterior, through the rough opening (RO) and then repositioned or pushed or pulled in an exterior direction to seat the fenestration unit, but this is generally less preferred. The ability and functionality to be installed from an interior side of the unit can be an important feature of the fenestration unit 10, as traditional fenestration installations require at least one installer on the exterior side of the rough opening (RO) and/or at least one installer on the interior side of the rough opening (RO).

The fenestration unit 10 is inserted into the rough opening (RO) until the anchoring clips 102 engage the edges of the rough opening (RO), and specifically the jamb portions of the rough opening framing. The anchoring clips 102 act as an engagement system that is positively engaged with the interior face of the rough opening framing from the interior side of the rough opening (RO) upon insertion therein.

The fenestration unit 10 is then centered in the rough opening (RO). The fenestration unit 10 may be centered side-to-side by inserting a screwdriver having a standard head (e.g., ¼-inch-thick head) and rotating the screwdriver to ensure a minimum desired gap is achieved at the first and second jambs 34, 36. To begin the shimming/levelling processes, a level is used to check the horizontal level of the fenestration unit 10 and one or more shims may be applied as needed to achieve a desired level.

Once a desired levelling and spacing is achieved at the sill portion of the fenestration unit 10, fasteners (e.g., screws or nails) are driven through the anchoring clips 102, corresponding to the two bottom-most clips on the fenestration unit 10, and into the rough opening framing.

The fenestration unit 10 can then continue to be plumbed, squared, and fully coupled to the framing of the rough opening (RO). For example, a user may plumb one of the first jamb 34 and the second jamb 36 to vertical level. In some embodiments, an installer may use an air bag designed for such a purpose that can be inflated to adjust the gap between the first and second jambs 34, 36 and the rough opening framing, and thus vertical level thereof, or other suitable methods may be implemented as desired. Once plumbed to be vertically level, the remaining anchoring clips 102 are fastened to the rough opening framing until all anchoring clips 102 are attached to the rough opening framing using one or more fasteners such that the fenestration unit 10 is structurally secured to the rough opening (RO).

Various advantages may be achieved according to the foregoing example systems and methods. The various examples may be one or more of: more efficient (e.g., cycle time reduced by 50% or more); easier to learn; easier to remember; easier to train; may be less physically demanding (e.g., fenestration unit 10 is not set from the exterior side which could be on uneven ground or require a ladder); fenestration unit 10 is unable to fall out toward exterior during installation; can be installed by a single person from the interior of the building structure; interior and exterior installation tasks do not need to be done simultaneously; improved fenestration unit 10 install quality and fenestration unit 10 performance following installation; delivers an installation method that is unique to the industry and offers many benefits for the installer; faster cycle times; improved performance (water and air infiltration); adapts to wall depth variation; simplifies casing installation for finish carpenters; separates interior and exterior work so they can be done "independently".

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A fenestration unit having an interior side and an exterior side that is configured for installation in an opening in a structure defined by a rough opening framing, the fenestration unit comprising:

a frame having a perimeter and defining a center; and at least one anchoring clip coupled to the perimeter of the frame and transitionable between a stowed configuration and an installation configuration, the at least one anchoring clip including, a coupling bracket having a first leg and a second leg, and a carrier bracket configured to receive a portion of the first leg, wherein, in the stowed configuration, the second leg projects inwardly away from the perimeter and toward the center of the frame, and wherein, in the installation configuration, the second leg projects outwardly from perimeter and away from the center of the frame.

2. The fenestration unit of claim 1, wherein the first leg and the second leg extend substantially orthogonal to one another.

3. The fenestration unit of claim 1, wherein the second leg includes at least one aperture configured to receive a fastener for securing the second leg to the rough opening framing in the installation configuration.

4. The fenestration unit of claim 1, wherein the coupling bracket includes at least one detent defined along a length of the first leg and the carrier bracket includes at least one catch configured to engage with the at least one detent in the installation configuration.

5. The fenestration unit of claim 4, wherein the at least one detent is positioned at a pre-selected length along the first leg corresponding to a wall depth of the rough opening framing.

6. The fenestration unit of claim 5, wherein the wall depth is one of a 2×4 wall depth, a 2×6 wall depth, or a 2×8 wall depth.

7. The fenestration unit of claim 4, wherein the at least one detent includes a plurality of detents positioned at ⅛-inch increments or less along a portion of the length of the first leg.

8. The fenestration unit of claim 4, wherein the at least one detent includes a plurality of detents positioned at ⅛-inch increments or greater along a portion of the length of the first leg.

9. The fenestration unit of claim 1, wherein the at least one anchoring clip is configured to provide an audible cue upon engagement of the coupling bracket and the carrier bracket during a transition from the stowed configuration to the installation configuration.

10. The fenestration unit of claim 1, wherein the carrier bracket includes at least one catch defining a ramp edge and the coupling bracket includes an insert guide defined along a leading edge of the coupling bracket, wherein the ramp edge is configured to contact the insert guide upon insertion of the coupling bracket within the carrier bracket in the installation configuration.

11. The fenestration unit of claim 10, wherein a portion of the carrier bracket is lifted away from the frame when the coupling bracket is received by the carrier bracket in the installation configuration.

12. The fenestration unit of claim 1, wherein the at least one anchoring clip is configured to require 8 lbs of force or less to receive the coupling bracket within the carrier bracket in the installation configuration.

13. The fenestration unit of claim 1, wherein the at least one anchoring clip has a first orientation feature defined by the coupling bracket and a second orientation feature defined by the carrier bracket, wherein the first orientation feature and the second orientation feature align with one another when the at least one anchoring clip is in the installation configuration.

14. The fenestration unit of claim 1, further including at least one gusset positioned at an intersection of the first leg and the second leg, wherein the at least one gusset creates a gap between the coupling bracket and the perimeter of the frame when the at least one anchoring clip is in the stowed configuration.

15. The anchoring clip of claim 14, wherein the at least one gusset is configured to create a marking on the perimeter of the frame in the installation configuration.

16. A fenestration unit having an interior side and an exterior side that is configured for installation in an opening in a structure defined by a rough opening framing, the fenestration unit comprising:

a frame having a perimeter; and at least one anchoring clip coupled to the perimeter of the frame, the at least one anchoring clip including, a coupling bracket having a first leg and a second leg, the first leg defining a length, wherein at least one detent is defined along a portion of the length, and wherein a leading end is defined at one end of the length, the leading end having an insert guide; and a carrier bracket having a receiving pocket configured to receive a portion of the first leg, the carrier bracket including at least one catch configured to be received within the at least one detent to releasably lock the first leg within the receiving pocket of the carrier bracket.

17. The fenestration unit of claim 16, wherein the at least one catch defines a ramp edge, and wherein, upon insertion of the first leg within the carrier bracket, the insert guide contacts the ramp edge and lifts a portion of the carrier bracket to facilitate receiving the coupling bracket within the carrier bracket.

18. The fenestration unit of claim 16, wherein the first leg is configured to be received within a generally central position of the receiving pocket, and wherein the at least one catch is configured to direct the insert guide to the generally central position of the receiving pocket.

19. The fenestration unit of claim 16, wherein the carrier bracket includes a backing plate and a receiver, and the receiving pocket is defined between the backing plate and the receiver.

20. The fenestration unit of claim 16, wherein the carrier bracket includes a receiver, and the receiving pocket is defined between the receiver and the perimeter of the frame.

21. The fenestration unit of claim 16, wherein the at least one anchoring clip is configured to provide feedback via at least one of an audible cue, tactile feedback, and a visible cue upon engagement of the coupling bracket and the carrier bracket.

22. The fenestration unit of claim 16, wherein the coupling bracket defines a first orientation feature and the carrier bracket defines a second orientation feature, wherein the first orientation feature and the second orientation feature are aligned with one another upon receipt of the coupling bracket within the carrier bracket at a pre-selected depth within the carrier bracket.

23. The fenestration unit of claim 22, wherein the pre-selected depth generally corresponds to a wall depth of the rough opening framing, and the wall depth is one of a 2×4 wall depth, a 2×6 wall depth, or a 2×8 wall depth.

24. The fenestration unit of claim 22, wherein the first orientation feature includes an edge cut out defined through a thickness of the carrier bracket and the second orientation feature includes a through hole defined through a thickness of the coupling bracket.

25. A fenestration unit having an interior side and an exterior side that is configured for installation in an opening in a structure defined by a rough opening framing, the fenestration unit comprising:

a frame having a center and a perimeter including an upper member, a lower member opposite the upper member, a first vertical member, and a second vertical member opposite the first vertical member; and a plurality of anchoring clips secured to the perimeter, each anchoring clip of the plurality of anchoring clips transitionable between a stowed configuration and an installation configuration, wherein a portion of each anchoring clip of the plurality of anchoring clips is configured to be coupled to an interior-facing side of the rough opening framing in the installation configuration.

26. The fenestration unit of claim 25, wherein the plurality of anchoring clips includes at least two anchoring clips.

27. The fenestration unit of claim 25, wherein the plurality of anchoring clips includes six anchoring clips.

28. The fenestration unit of claim 27, wherein three anchoring clips of the six anchoring clips are coupled to the first vertical member and three anchoring clips of the six anchoring clips are coupled to the second vertical member.

29. The fenestration unit of claim 25, wherein each anchoring clip of the plurality of anchoring clips includes, a coupling bracket having a first leg and a second leg, and a carrier bracket configured to receive a portion of the first leg, wherein, in the stowed configuration, the second leg projects inwardly away from the perimeter toward the center of the frame, and wherein, in the installation configuration, the second leg projects outwardly from perimeter and away from the center of the frame.

30. The fenestration unit of claim 29, wherein the first leg and the second leg extend substantially orthogonal to one another.

* * * * *